(12) United States Patent
Rimmer et al.

(10) Patent No.: US 9,107,259 B2
(45) Date of Patent: Aug. 11, 2015

(54) ELECTRICAL SYSTEM USING HIGH FREQUENCY AC AND HAVING INDUCTIVELY CONNECTED LOADS, AND RELATED POWER SUPPLIES AND LUMINAIRES

(75) Inventors: Philip John Rimmer, London Greater London (GB); Carole Sherrington, Chelmsford Essex (GB)

(73) Assignee: Isotera Limited, Hoddesdon (GB)

( * ) Notice: Subject to any disclaimer, the term of this patent is extended or adjusted under 35 U.S.C. 154(b) by 280 days.

(21) Appl. No.: 13/256,946

(22) PCT Filed: Mar. 19, 2010

(86) PCT No.: PCT/GB2010/050472
§ 371 (c)(1),
(2), (4) Date: Sep. 16, 2011

(87) PCT Pub. No.: WO2010/106375
PCT Pub. Date: Sep. 23, 2010

(65) Prior Publication Data
US 2012/0001563 A1  Jan. 5, 2012

(30) Foreign Application Priority Data

Mar. 19, 2009  (GB) .................................. 0904719.2
Mar. 19, 2009  (GB) .................................. 0904728.3
May 13, 2009   (GB) .................................. 0908207.4
May 13, 2009   (GB) .................................. 0908208.2

(51) Int. Cl.
*H05B 37/02* (2006.01)
*H05B 33/08* (2006.01)

(52) U.S. Cl.
CPC ........ *H05B 33/0815* (2013.01); *H05B 33/0803* (2013.01)

(58) Field of Classification Search
USPC .......... 315/256, 291, 254; 307/27, 21, 31, 73, 307/38, 24
See application file for complete search history.

(56) References Cited

U.S. PATENT DOCUMENTS 3,787,752 A    1/1974   Delay
4,264,827 A  * 4/1981   Herzog ........................... 307/17
(Continued)

FOREIGN PATENT DOCUMENTS

EP    0 587 923 A1   3/1994
EP    1 335 477 A2   8/2003
(Continued)

OTHER PUBLICATIONS

Acker et al. "Current-controlled synchronous rectification", Applied Power Electronics Conference and Exposion, 1994.*
(Continued)

*Primary Examiner* — Douglas W Owens
*Assistant Examiner* — Borna Alaeddini
(74) *Attorney, Agent, or Firm* — Carter, DeLuca, Farrell & Schmidt LLP

(57) ABSTRACT

Electrical systems are provided which include a power distribution system for distributing high frequency AC power having a twisted pair conductor and power tapping element, for instance to an LED or OLED load. The electrical systems include an LED or OLED luminaire having a heat sink and a light diffusing optical element and power supplies for powering LEDs or OLEDs such as those used in the luminaire.

10 Claims, 25 Drawing Sheets

(56) References Cited

U.S. PATENT DOCUMENTS

| | | | |
|---|---|---|---|
| 5,998,936 A * | 12/1999 | Nilssen | 315/209 R |
| 6,172,466 B1 | 1/2001 | Ki et al. | |
| 6,301,139 B1 * | 10/2001 | Patel | 363/127 |
| 6,563,719 B1 | 5/2003 | Hua | |
| 7,646,029 B2 * | 1/2010 | Mueller et al. | 257/84 |
| 2005/0207182 A1 | 9/2005 | Wang | |
| 2007/0076459 A1 | 4/2007 | Limpkin et al. | |
| 2007/0195527 A1 | 8/2007 | Russell | |
| 2007/0236159 A1 | 10/2007 | Beland | |
| 2010/0046259 A1 | 2/2010 | Ho et al. | |

FOREIGN PATENT DOCUMENTS

| | | |
|---|---|---|
| EP | 1 411 754 A1 | 4/2004 |
| EP | 1 791 399 A1 | 5/2007 |
| JP | 7 087691 A | 3/1995 |
| JP | 07-337005 A | 12/1995 |
| WO | 97/12436 A1 | 4/1997 |
| WO | 97/16054 A1 | 5/1997 |
| WO | 2005/078338 A1 | 8/2005 |

OTHER PUBLICATIONS

International Search Report for Appln. No. PCT/GB2010/050472 mailed Oct. 18, 2010.

Acker et al. "Current-controlled synchronous rectification", Applied Power Electronics Conference and Exposition, 1994, p. 185.

* cited by examiner

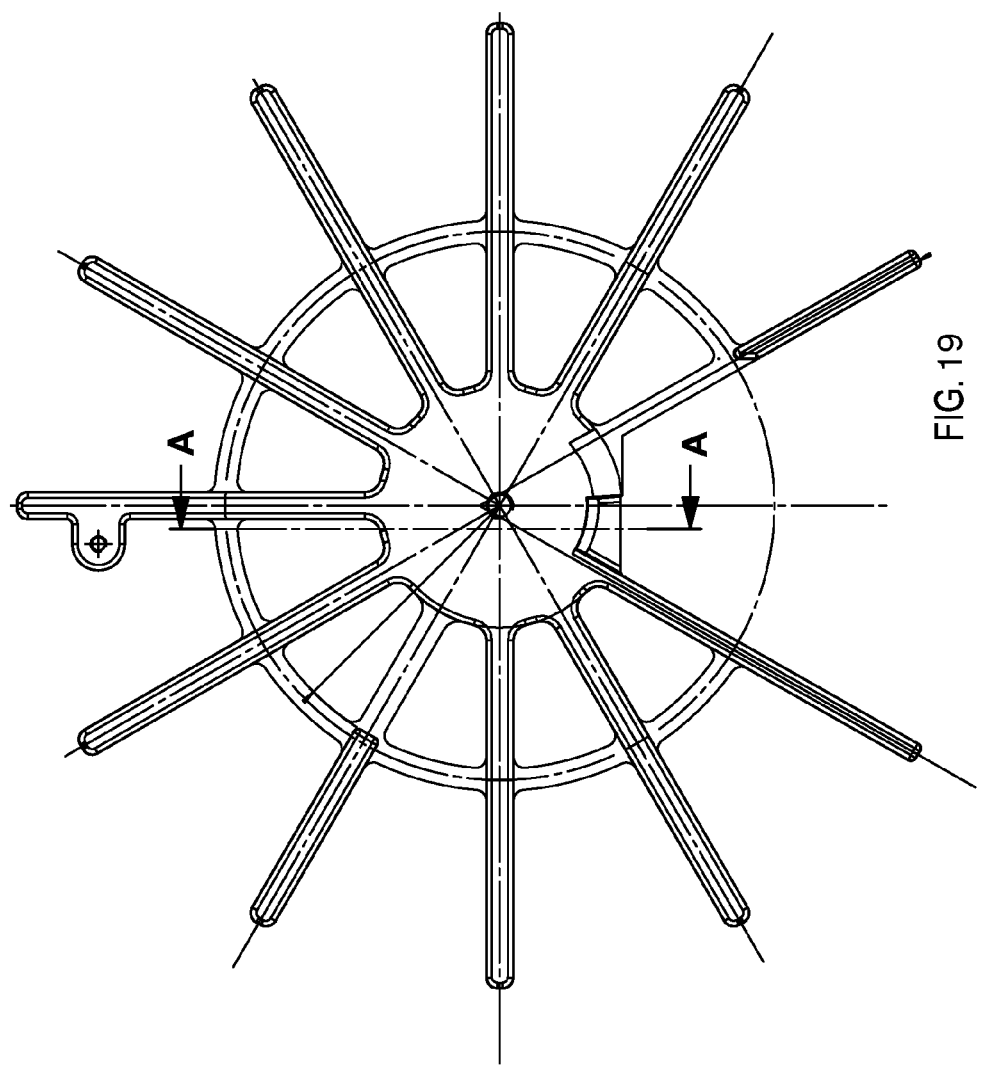

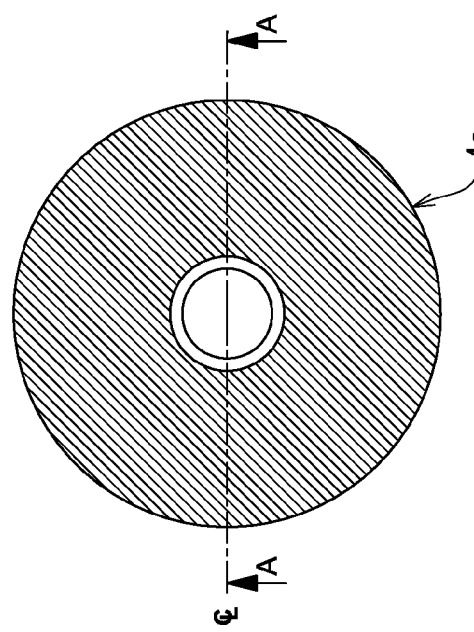
FIG. 22 TOP ELEVATION
FIG. 23 SECTION VIEW A-A

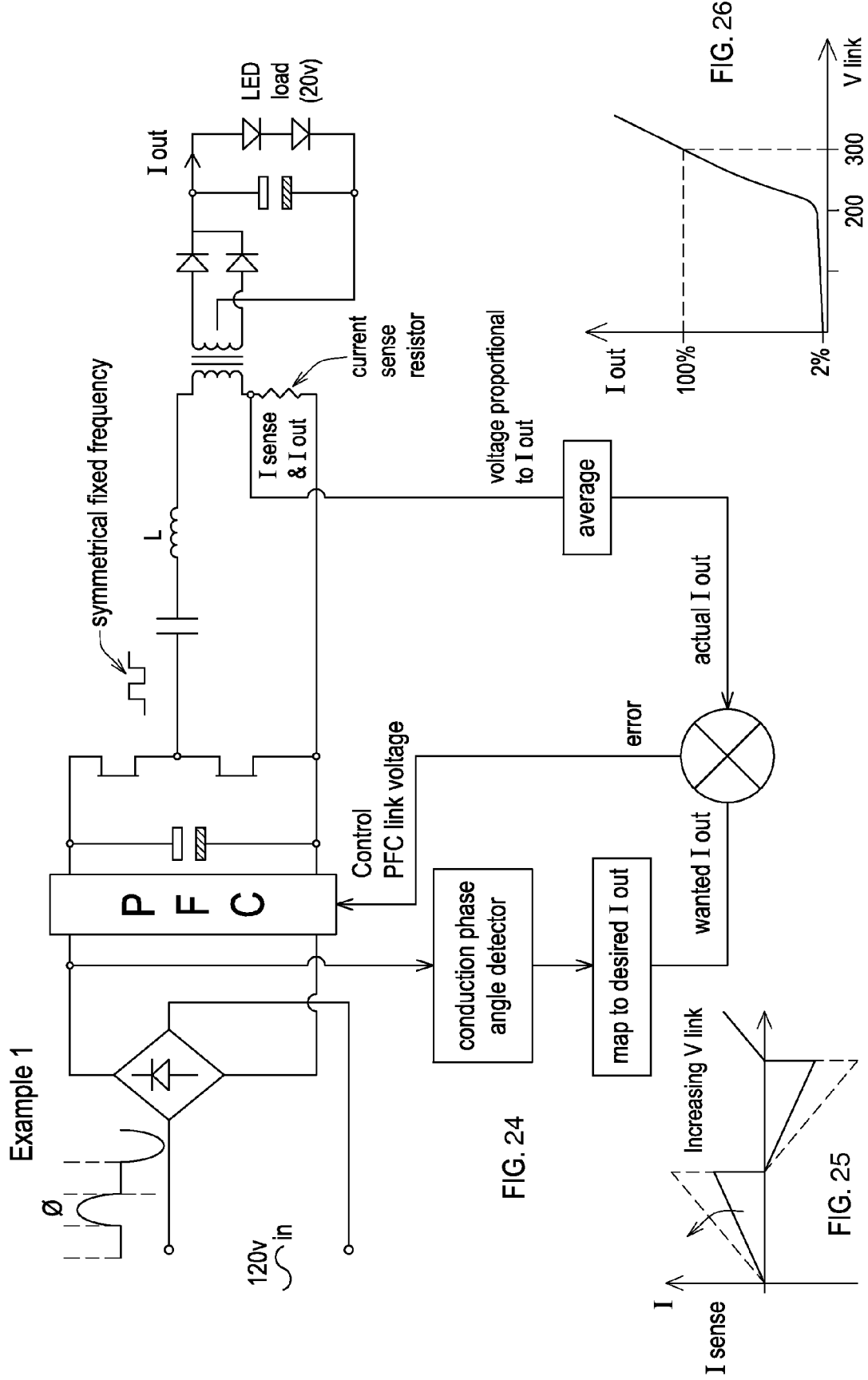

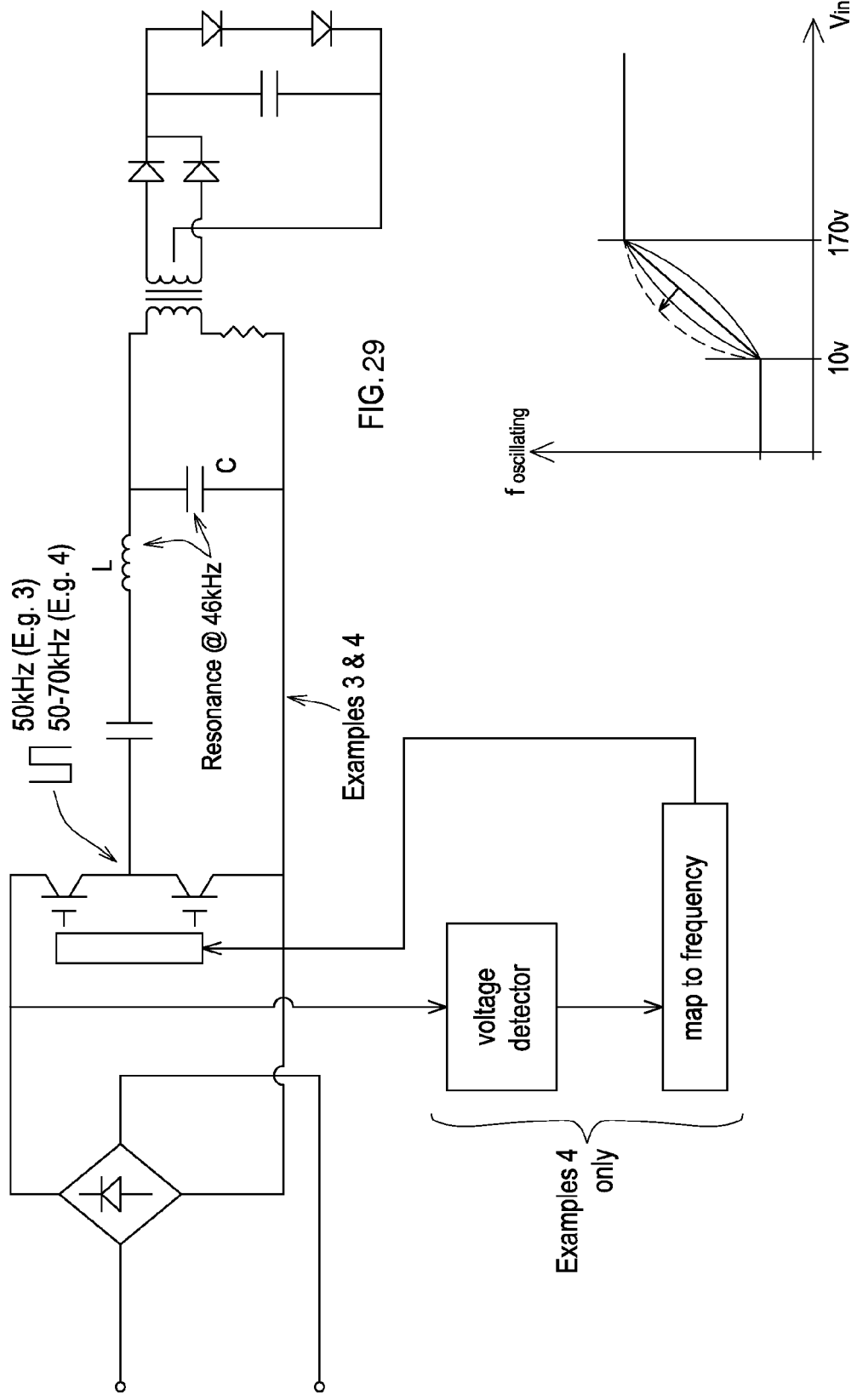

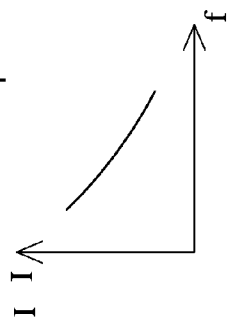
FIG. 32
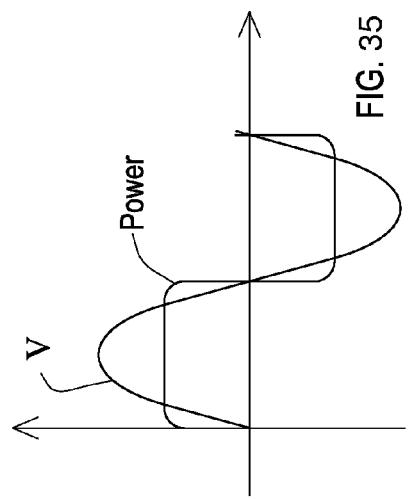
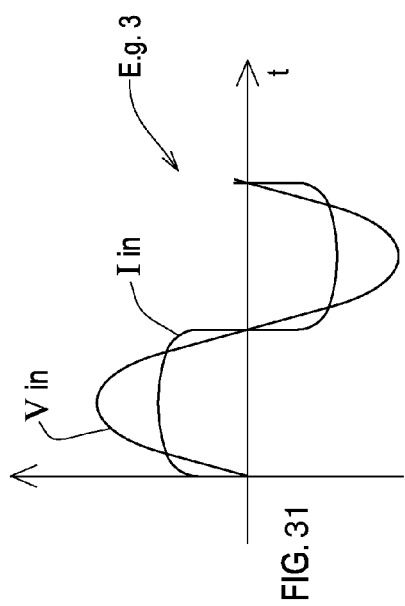
FIG. 31
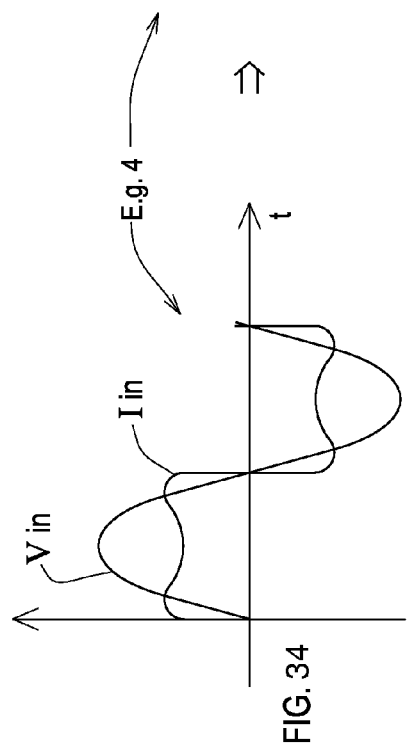
FIG. 34
FIG. 35
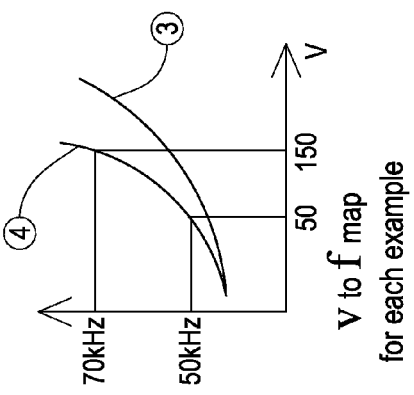
FIG. 33

ELECTRICAL SYSTEM USING HIGH FREQUENCY AC AND HAVING INDUCTIVELY CONNECTED LOADS, AND RELATED POWER SUPPLIES AND LUMINAIRES

THE INVENTIONS described herein relate to electrical systems, and more particularly relate to electrical systems with improved efficiency over the prior art.

A Power Distribution System

THE PRESENT INVENTION relates to a power distribution system, and more particularly relates to a power distribution system for distributing high frequency alternating current (HFAC).

A conventional electrical "mains" power supply usually supplies electricity at 110V or 240V AC at a frequency of 50 or 60 Hz. Most electrical devices, such as incandescent light bulbs, are powered directly by the mains supply.

There are numerous problems with conventional mains power supplies. For instance, it is not easy to reconfigure a mains supply once it has been installed in a building. Electrical sockets connected to the mains supply system must be hard wired to the supply which can be a difficult, time consuming and potentially dangerous if not done by a professional electrician.

If a hard wired mains socket is not in a convenient position then an extension lead can be used. An extension lead is, however, not a good solution to this problem because the extension lead leaves a live mains cable trailing from the hard wired mains socket to the mains device which is being powered. The mains cable may be damaged by something falling on or cutting the cable to expose live mains wiring. Furthermore, the socket at the free end of the extension lead can be hazardous if the socket is exposed to water or moisture. Mains extension leads are therefore usually not suitable for use in damp or wet areas, such as bathrooms.

Transformers are often used to step a mains voltage up or down to a required voltage. Conventional mains transformers are bulky and, in most cases, inefficient.

It has been proposed previously to provide a high frequency AC electrical supply instead of a conventional mains supply to alleviate some of the above problems. Prior proposed high frequency AC power supplies provide a voltage of between, for example, 150V and 1 kV, at an operating frequency of greater than 10 kHz, but most preferably at a frequency of 60 kHz.

Transformers and rectifiers for converting high frequency AC power are less bulky but more efficient than conventional mains transformers and rectifiers because of the high operating frequency.

Whilst using high frequency AC in place of a conventional mains supply overcomes some of the problems with a conventional mains supply, the use of high frequency AC can give rise to some new problems. The most notable problem with high frequency AC is that, unless special precautions are taken, the high frequency AC generates radio interference which can interfere with radio devices. This unwanted radio interference contravenes official international power supply standards.

The present invention seeks to provide an improved power distribution system.

A Power Supply

THE PRESENT INVENTION relates to a power supply, and more particularly relates to a power supply for supplying power to a light emitting diode (LED) or an organic light emitting diode (OLED).

A conventional diode rectifier does not operate efficiently when providing a rectified low voltage output. For instance, a conventional diode rectifier can waste 15 to 20% of input power when outputting a rectified voltage of 3.5V.

It is known to use synchronous rectification in place of conventional diode rectification to deliver a low voltage output at high efficiency. Synchronous rectification makes use of active switching to reduce power loss to around 1%. In order to achieve this high efficiency, conventional synchronous rectification circuits are often complex because they incorporate sophisticated control circuitry to control switches. Conventional synchronous rectification circuits therefore often incorporate a large number of components which are expensive and which reduce efficiency.

A power supply for powering an LED is usually configured to servo control the power supply's input voltage source in response to current monitored at the output of the power supply. This servo control technique is inefficient and complex and impairs the performance of the synchronous rectifier circuit. For instance, there is a risk that rectifying switches in the circuit may be turned on at the same time due to servo control, potentially causing destructive currents (initially unlimited) to flow within the circuit.

It has been proposed previously to add further control circuitry to improve the performance of a conventional servo controlled power supply. However, the further circuitry increases the complexity of the circuit yet further and results in sub-optimum switching which in turn reduces efficiency.

A conventional synchronous rectification circuit $1b$ is shown in FIG. 7 of the accompanying drawings. The circuit $1b$ incorporates a driver circuit $2b$ which controls the MOSFET switches Q$1b$ and Q$2b$. The current in Q$1b$ and/or Q$2b$ is monitored to check for cross conduction.

The circuit 1 operates in a deadband when both Q$1b$ and Q$2b$ are off, as illustrated by the waveforms shown in FIG. 8.

There are several problems with this conventional synchronous rectification circuit:

1. In the deadband, the body diodes within Q$1b$ and Q$2b$ must conduct, wasting power at maximum current.
2. The sense resistors R$1b$, R$2b$ and R$3b$ waste energy and are expensive.
3. The driver circuit $2b$ must be complex to drive the switches Q$1b$ and Q$2b$ efficiently. The complexity of the driver circuit $2b$ means that the circuit $2b$ is expensive and difficult to implement.

The present invention seeks to provide an improved power supply.

A Luminaire

This invention relates to a luminaire and more particularly to a light emitting diode (LED) luminaire or an organic light emitting diode (OLED) luminaire.

LED emitters are compact and uniform in nature allowing compact lighting optics that are low in cost and very high in efficiency. LED emitters make excellent spot lights and focussed light sources but more general downlighter applications are less easy to produce because the small optics creates the effect of glare and a point source of light.

For ceiling mounted luminaires, there is little on the ceiling that is moderately illuminated so the psychological effect is one of a dark space which is not inviting or aesthetically pleasing. For wall-mounted luminaires, the same drawback applies.

Another additional problem for LED luminaires is their requirement for extensive heatsinking to keep the LED emitters cool enough to function properly. The heatsink needs to be near the emitters, the heat generators, but heatsinks are deemed by the market to be unsuitable for visible display.

Downlighters are not typically compact in design. It is desirable for a downlighter to be fitted to the surface of a ceiling without requiring space above it. Likewise it is desirable for wall-mounted luminaires to fit on a wall surface without requiring a part of the body of the luminaire to be mounted in or behind a wall surface.

The present invention seeks to provide an improved luminaire.

A Power Supply

THE PRESENT INVENTION relates to a power supply, and more specifically relates to a power supply for supplying power to an LED or an OLED.

"Phase-Cut dimmer" is a term used to describe conventional dimmers that delay conduction of the leading edge of the mains supply AC waveform until some conduction angle determined by a control. They often use Triac semiconductor devices that require a minimum current in order to sustain conduction, a "holding current". These types of dimmer usually rely upon a small leakage current into the connected load to provide a supply to their internal circuit and do not work well with standard switch-mode power supplies. "Leading Edge Phase cut" is another term used to describe these dimmers.

"Phase-angle conduction" dimmers allow conduction of the AC waveform until some conduction angle determined by a control. They often use transistor type devices that normally do not have minimum current requirements. This type of dimmer usually uses a separate connection for supply of the internal control circuits. "Trailing Edge Phase cut" is another term used to describe these dimmers.

The holding current requirement of most leading edge dimmer types requires that the input section of a power supply is able immediately to conduct as the AC voltage at the input rises from zero. This either means that a load is permanently present at the input or is present when the AC input is zero and until the subsequent power stages are in conduction. Some designs use a resistor for this purpose, switched with a transistor.

The present invention seeks to provide an improved power supply.

According to one aspect of the present invention, there is provided a power distribution system for distributing high frequency AC power from a current limited power source, the system comprising: a twisted pair of elongate conductors configured to be connected to the power source, the ends of the conductors furthest from the power source being connected to one another, wherein the conductors between adjacent turns of the twisted pair are moveable apart from one another to define an aperture therebetween, and a power tapping element which is configured to be inserted at least partly through the aperture so that electrical power can be coupled inductively from the conductors to the power tapping element.

In one embodiment the power tapping element is a splittable ferrite member.

In another embodiment the power tapping element comprises two spaced apart ferrite members.

Preferably one ferrite member is configured to be inserted at least partly through the aperture in the twisted pair and the other ferrite member configured to be inserted at least partly through a second aperture in the twisted pair.

Conveniently a further conductor is wound at least partly around the power tapping element so that electrical power can be coupled inductively from the power tapping element to the further conductor.

Advantageously a synchronous rectification circuit is connected to the further conductor to convert high frequency AC power in the further conductor to a DC regulated voltage to power a load.

Preferably the load is an LED.

Conveniently the system further comprises a short circuit switch to short circuit the rectification circuit to stop power being transmitted to the load.

Advantageously the short circuit switch is an electronic switch.

Preferably the short circuit switch is a rectifier in a synchronous rectification circuit.

Conveniently the electronic switch is powered by power from the twisted pair.

Advantageously the system incorporates a pulse density modulation arrangement to modulate power output from the system.

Preferably the system incorporates a plurality of power tapping elements which are each configured to attach to the twisted pair to tap power from the twisted pair.

Conveniently the system further comprises a current limited high frequency AC power source which is connected to the twisted pair.

Advantageously the power source is configured to convert mains power to high frequency AC power.

According to another aspect of the present invention, there is provided a power supply comprising a high frequency, high impedance power source, alternating with a limited rate of change of current, a first MOSFET switch, and a second MOSFET switch, the first and second switches being connected to define a full wave rectifier, the power supply being configured to output a constant current to a load which limits the output voltage of the power supply such that a control voltage which drives the switches is maintained within an appropriate range for the switches, wherein the gate of the first switch is driven by the drain of the second switch and the gate of the second switch is driven by the drain of the first switch.

Preferably the minimum rate of change of current of the high impedance power source is twice the peak to peak amplitude of the current divided by the period of the current wave.

Conveniently the maximum rate of change of current of the high impedance power source is ten times the peak to peak amplitude of the current divided by the period of the current wave.

Advantageously the source of the first switch is connected to the source of the second switch.

Preferably the drains of the first and second switches are connected respectively to each end of a secondary winding of a transformer, the primary winding of the transformer being connected to the power source.

Conveniently the load is connected to a centre tap of the secondary winding of the transformer.

According to a further aspect of the present invention, there is provided power supply comprising a high frequency, high impedance power source, alternating with a limited rate of change of current, a transformer, the primary winding of the transformer being connected to the power source and a centre tap of the secondary winding of the transformer being connected to a load, a first MOSFET switch, and a second MOSFET switch, the first and second switches being connected to define a full wave rectifier, the power supply being configured to output a constant current to the load which limits the output voltage, wherein the gate of the first switch and the gate of the second switch are connected respectively to each end of a drive winding of the transformer so that the gates of the switches are driven by power from the transformer.

Preferably the number of turns of the drive winding of the transformer is less than the number of turns of the secondary winding of the transformer to limit the voltage input to the gates of the switches to an appropriate level. Conveniently a resistor is connected between the centre tap of the secondary winding of the transformer and a centre tap of the drive winding of the transformer.

Advantageously the centre tap of the drive winding of the transformer is connected to the sources of the switches.

Preferably the power supply further comprises a biasing circuit to bias the gates of the switches to substantially eliminate body diode conduction in the switches.

Conveniently the first and second switches are configured to be turned on simultaneously so that power is gated to the load.

Advantageously the power supply further comprises a pulse density modulation (PDM) circuit to modulate the power source.

Preferably the load is an LED light source.

Conveniently an LED lighting device incorporates an LED and a power supply as defined above.

According to a yet further aspect of the present invention, there is provided a luminaire for an LED light source generating light and heat, the luminaire comprising a mounting to receive an LED light source; one or more heatsink elements in thermal contact with the LED mounting to conduct generated heat away from the LED mounting; an optical mask spaced apart from the LED mounting to allow a first portion of light from an LED source fitted, in use, in the mounting to pass substantially uninterrupted by the mask and to interrupt a second portion of light from the LED source, the interrupted light being dispersed through the optical mask, wherein the one or more heatsink elements are located behind the mask and thus shielded from view by the mask and light emanating from the mask.

Preferably the optical mask has an aperture through which the first portion of light from the LED source passes substantially uninterrupted.

Conveniently the mask is a light pipe or waveguide.

Advantageously the luminaire is combined with an LED or an LED compact array which are received in the mounting.

Preferably a vent is provided in the periphery of the space envelope of the luminaire.

Conveniently one or more of the heatsink elements are aligned with the vent to direct air flow from the aperture to the vent.

Advantageously the luminaire is a ceiling mounted luminaire.

Preferably the structure of the luminaire has an airflow path from adjacent the LED mounting, along the one or more heatsink elements and out of the luminaire.

Conveniently the structure of the luminaire has an airflow path from an opening to ambient air directly opposite the LED mounting, along the one or more heatsink elements and out of the luminaire.

According to a yet further aspect of the present invention, there is provided a luminaire for an LED light source generating light and heat, the luminaire comprising a mounting to receive an LED light source; one or more heatsink elements in thermal contact with the LED mounting to conduct generated heat away from the LED mounting; an optical mask spaced apart from the LED mounting to allow a first portion of light from an LED source fitted, in use, in the mounting to pass substantially uninterrupted by the mask and to interrupt a second portion of light from the LED source, the interrupted light being dispersed through the optical mask, wherein the structure of the luminaire has an airflow path past the optical mask, along the one or more heatsink elements and out of the luminaire.

According to a still further aspect of the present invention, there is provided a luminaire for an LED light source generating light and heat, the luminaire comprising a mounting to receive an LED light source; one or more heatsink elements in thermal contact with the LED mounting to conduct generated heat away from the LED mounting; an optical mask spaced apart from the LED mounting to allow a first portion of light from an LED source fitted, in use, in the mounting to pass substantially uninterrupted by the mask and to interrupt a second portion of light from the LED source, the interrupted light being dispersed through the optical mask, wherein the structure of the luminaire has an airflow path from an opening to ambient air directly opposite the LED mounting, along the one or more heatsink elements and out of the luminaire.

According to another aspect of the present invention, there is provided a power supply configured to convert AC power to DC power and to output a regulated DC current, the power supply comprising a variable output power factor correction circuit for receiving AC power input to the power supply; a conduction phase angle detector configured to detect the conduction phase angle of an AC voltage input to the power supply; an inverter configured to invert power output from the power factor correction circuit into a high frequency AC signal having a symmetrical duty cycle, the power factor correction circuit configured to vary its output to vary the amplitude of the high frequency AC signal in dependence upon the conduction phase angle; an inductor to ballast the high frequency AC signal; and a rectifier circuit connected to the inverter to rectify the high frequency AC signal to provide DC power at the output of the power supply.

According to another aspect of the present invention, there is provided a power supply configured to convert AC power to DC power and to output a regulated DC current, the power supply comprising a variable output power factor correction circuit for receiving AC power input to the power supply; a conduction phase angle detector configured to detect the conduction phase angle of an AC voltage input to the power supply; an inverter configured to invert power output from the power factor correction circuit into a high frequency AC signal having a symmetrical duty cycle, the power factor correction circuit configured to vary its output to vary the frequency of the high frequency AC signal in dependence upon the conduction phase angle; an inductor to ballast the high frequency AC signal; and a rectifier circuit connected to the inverter to rectify the high frequency AC signal to provide DC power at the output of the power supply.

A luminaire having an LED light source with a power supply as described above.

Preferably the luminaire has a housing or space envelope and the power supply is located within the luminaire housing or space envelope.

Conveniently the power supply is integrated into the luminaire.

Advantageously the power supply is mechanically coupled to the luminaire housing.

According to another aspect of the present invention, there is provided a method of providing a DC power source output comprising measuring the conduction phase angle of an AC voltage input to the power supply; applying power factor correction to the AC power input to the power supply using a variable output power factor correction circuit to provide a power signal; inverting the power signal to provide a high frequency symmetrical duty cycle AC signal; varying the output of the power factor correction circuit in dependence upon the conduction phase angle of the AC voltage input to the power supply to vary the amplitude of the high frequency AC signal; and ballasting and rectifying the high frequency AC signal to provide a DC power source output.

According to another aspect of the present invention, there is provided a method of providing a DC power source output comprising measuring the conduction phase angle of an AC voltage input to the power supply; applying power factor correction to the AC power input to the power supply using a variable output power factor correction circuit to provide a power signal; inverting the power signal to provide a high frequency symmetrical duty cycle AC signal; varying the output of the power factor correction circuit in dependence upon the conduction phase angle of the AC voltage input to the power supply to vary the frequency of the high frequency AC signal; and ballasting and rectifying the high frequency AC signal to provide a DC power source output.

According to another aspect of the present invention, an electrical arrangement comprises a power supply and at least two loads to be powered by the power supply, the power supply configured to produce intermediary power in the form of a predetermined regulated high frequency alternating RMS current waveform, said current flowing through the separate primary windings of at least two coupling transformers, the secondary windings of which are, independently of one another, each connected to a respective one of the loads and are each adapted to supply a predetermined current to the respective load via one or more rectifiers.

According to another aspect of the present invention, there is provided an electrical arrangement comprises a housing containing a power supply and at least two loads to be powered by the power supply, the power supply being configured to produce intermediary power in the form of a predetermined regulated high frequency alternating RMS current waveform, said current flowing through the separate primary windings of at least two coupling transformers, the secondary windings of which are, independently of one another, each connected to a respective one of the loads and are each adapted to supply a predetermined current to the respective load via one or more rectifiers.

According to another aspect of the present invention, there is provided a luminaire arrangement comprises a housing containing a power supply and at least two loads to be powered by the power supply, the power supply being configured to produce intermediary power in the form of a predetermined regulated high frequency alternating RMS current waveform, said current flowing through the separate primary windings of at least two coupling transformers, the secondary windings of which are, independently of one another, each connected to a respective one of the loads and are each adapted to supply a predetermined current to the respective load via one or more rectifiers.

Preferably the frequency of the high frequency current is 10 khz to 1 MHz.

Conveniently the frequency of the high frequency current is 20 kHz to 200 kHz.

Advantageously the frequency of the high frequency current is 50 kHz-100 kHz.

Preferably one or more of the loads are regulated to a lower average power by the periodic operation of a shorting switch.

Conveniently periodic operation of the shorting switch comprises driving of the switch with a pulse width modulated signal.

Advantageously the rectifier or each rectifier is a synchronous rectifier.

Preferably the periodic operation of the shorting switch is provided by simultaneous conduction of the synchronous rectifiers.

Conveniently the coupling transformers have soft magnetic cores which are operated at a sufficiently high flux such that, upon any open circuit failure of its load, the core will saturate leaving the intermediary current and any alternate load substantially unaffected by the failure.

Advantageously the high flux is anything above one third of the saturation flux density of the core for any one of the coupling transformers.

Preferably one of the loads failing open circuit will result in the operation of the shorting switch.

Conveniently a load failing will result in the simultaneous conduction of the synchronous rectifier devices.

Advantageously the relative brightness of the loads is adjusted by periodic switching of the shorting switch at one or each of the loads and/or the overall brightness is adjusted through adjusting the magnitude of the intermediary constant current, high frequency alternating waveform.

In order that the invention may be more readily understood, and so that further features thereof may be appreciated, embodiments of the invention will now be described, by way of example, with reference to the accompanying drawings in which:

FIG. 1 is a diagrammatic view of a power distribution system in accordance with a preferred embodiment of the invention, FIG. 2 is a diagrammatic perspective view of part of the power distribution system shown in FIG. 1, FIG. 3 is a diagrammatic view of part of the power distribution system according to another embodiment of the invention, FIG. 4 is a circuit diagram of a synchronous rectification circuit, FIG. 5 is a circuit diagram of a further synchronous rectification circuit, and FIG. 6 is a diagram showing a waveform representing pulse density modulation.

FIG. 7 is a circuit diagram showing a conventional synchronous rectification circuit, FIG. 8 is a timing diagram showing the periods of deadband during the operation of the conventional circuit shown in FIG. 7, FIG. 9 is a circuit diagram of a synchronous rectification circuit in accordance with a preferred embodiment of the invention, FIG. 10 is a circuit diagram showing a synchronous rectification circuit according to a further embodiment of the invention, FIG. 11 is a circuit diagram showing a synchronous rectification circuit according to a yet further embodiment of the invention, FIG. 12 is a waveform diagram showing a MOSFET drain voltage waveform during operation of the synchronous rectification circuit shown in FIG. 9, and FIG. 13 is a waveform diagram showing the MOSFET drain voltage waveform during operation of the synchronous rectification circuit shown in FIG. 10.

FIGS. 17-20 are views of a heatsink for use with the luminaire, and FIGS. 21-23 are views of an optic for use with the luminaire.

FIG. 24 is a circuit diagram of a first embodiment of the invention,

FIG. 25 is a graph soeing the sense current in the embodiment show in FIG. 24,

Figures 27, 28:
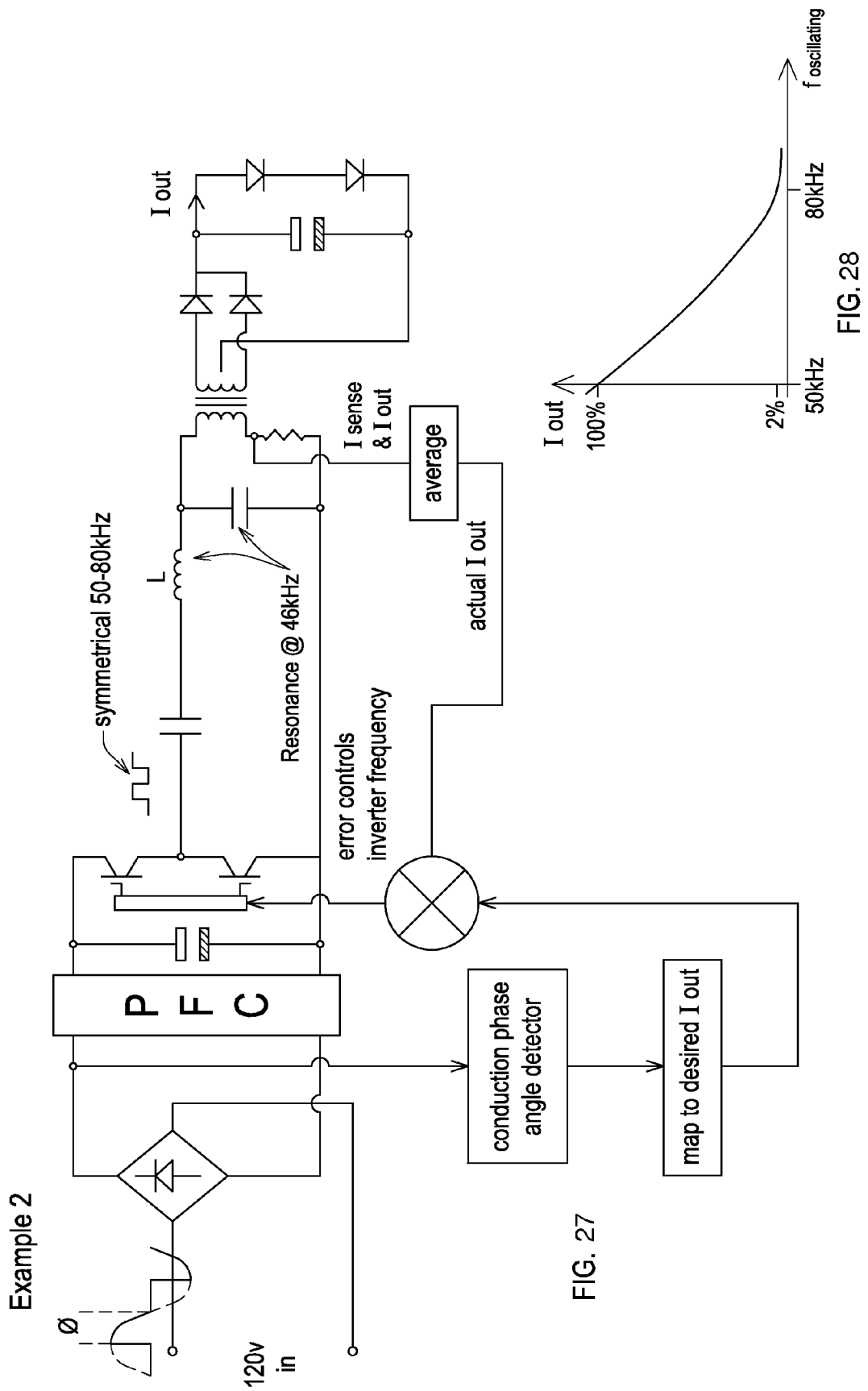
Figure 36:
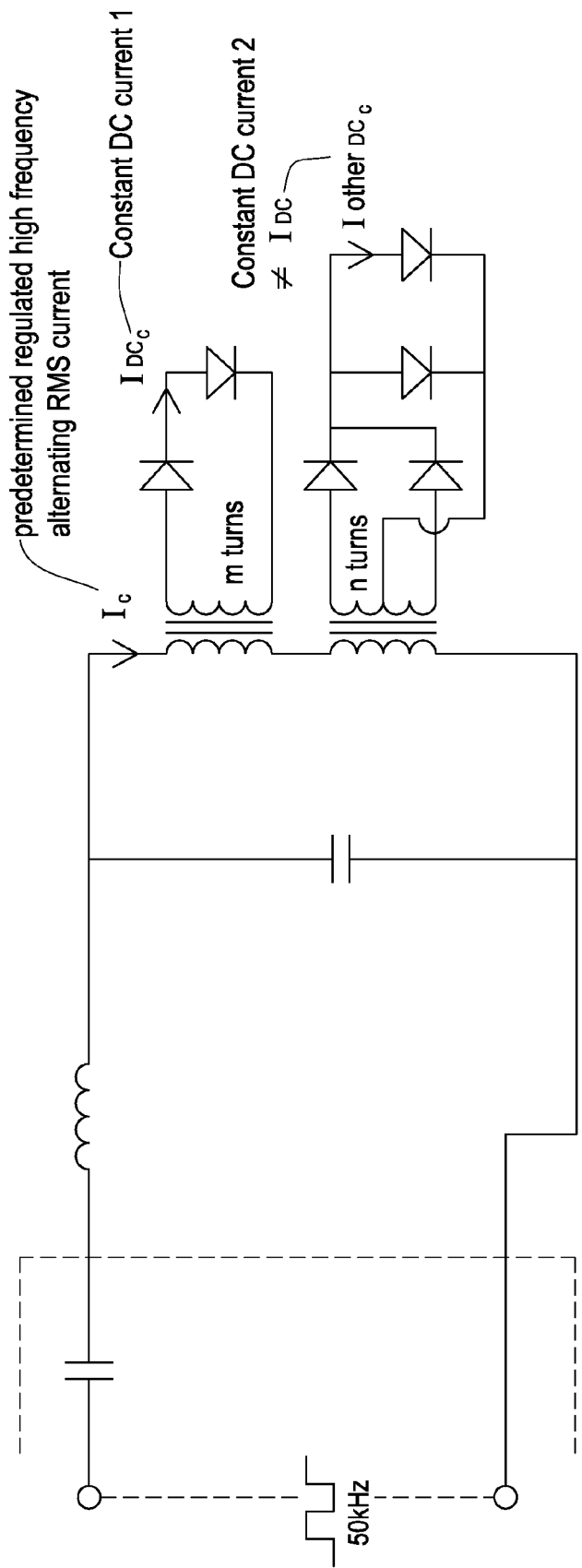
Figure 37:
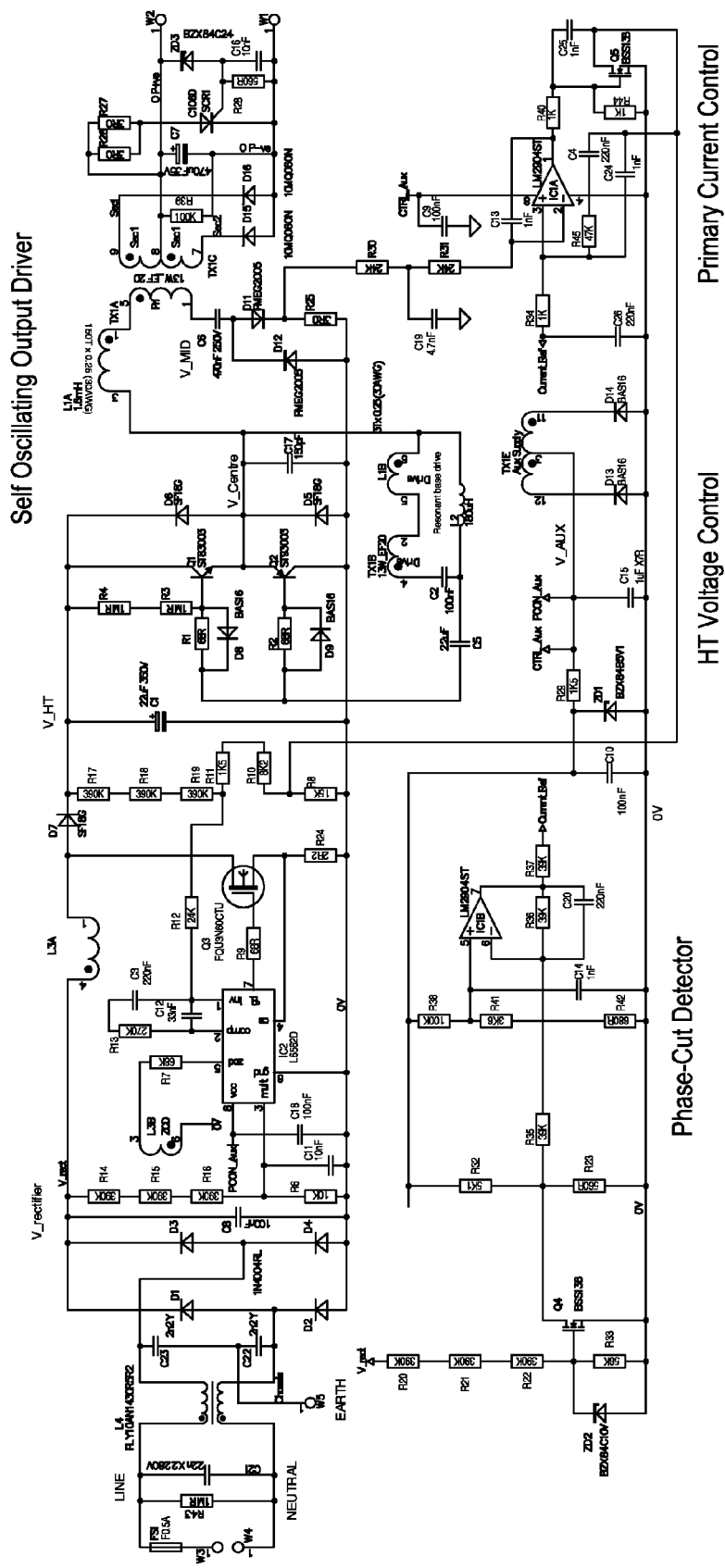

FIG. 26 is a graph showing the output current in proportion to the link voltage of the embodiment shown in FIG. 24, FIG. 27 is a circuit diagram of a second embodiment of the invention, FIG. 28 is a graph showing the output current in proportion to the frequency of the embodiment shown in FIG. 27, FIG. 29 is a circuit diagram of a third embodiment of the invention which is used in examples 3 and 4 described below, FIG. 30 is a graph showing the oscillating frequency in proportion to the input voltage of the embodiment shown in FIG. 29, FIG. 31 is a graph showing the input voltage and input current of the embodiment shown in FIG. 29 and corresponding to example 3 described below, FIG. 32 is a graph showing the frequency to current behavior for examples 3 and 4, FIG. 33 is a graph showing the frequency in proportion to the voltage for examples 3 and 4 of the embodiment shown in FIG. 29, FIG. 34 is a graph showing the input voltage and input current of the embodiment shown in FIG. 29 and corresponding to example 4 described below, FIG. 35 is a graph corresponding to the graph of example 4 shown in FIG. 34, FIG. 36 is a simplified circuit diagram of a preferred embodiment of the invention, and FIG. 37 is a circuit diagram of the preferred embodiment of the invention.

POWER DISTRIBUTION SYSTEM

Figure 1:
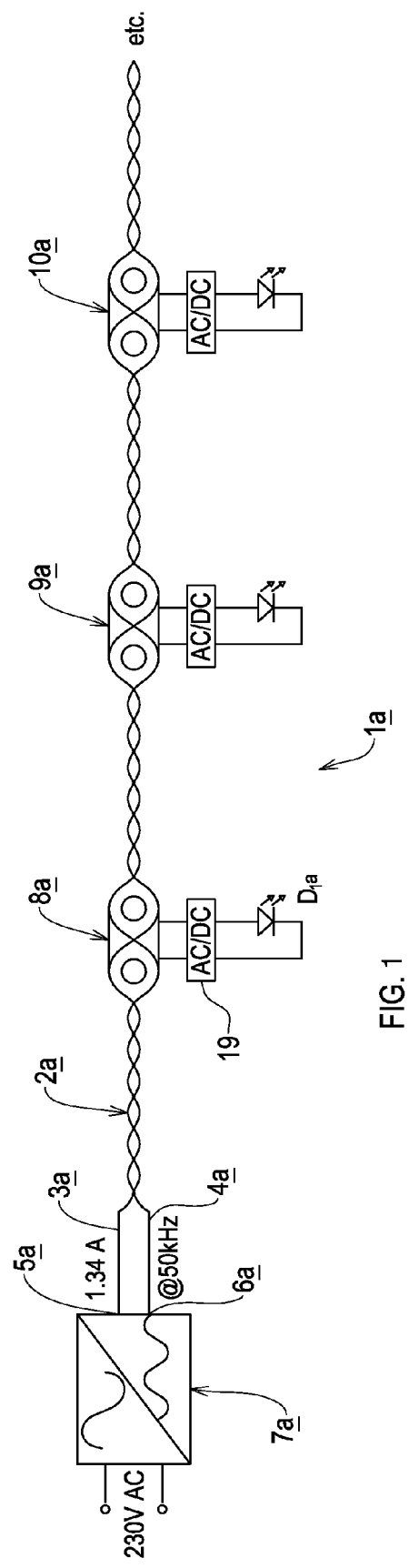

Referring initially to FIG. 1 of the accompanying drawings, a power distribution system 1a according to a preferred embodiment of the invention incorporates a twisted pair 2a which comprises a twisted pair of elongate conductors 3a,4a. The conductors 3a,4a are formed from a single loop of insulated wire which is folded in half and twisted to form the twisted pair 2a. The free ends 5a,6a of the conductors 3a,4a are positioned adjacent one another and connected to a high frequency AC power source 7a.

The high frequency AC power source 7a preferably converts mains electricity at 110V or 240V AC at a frequency of 50 Hz or 60 Hz to high frequency AC power at approximately 1.34 A at approximately 50 kHz. The high frequency AC power source is current limited.

The high frequency AC power source preferably provides a voltage of between 150V and 1 kV, at an operating frequency of greater than 10 kHz, but most preferably at a frequency of 60 kHz. The loop defined by the twisted pair 2a equates to turns of a transformer coil which is connected to the high frequency AC power source 7a.

The power distribution system 1a incorporates a power tapping element 8a which is a splittable ferrite element. Identical second and third power tapping elements 9a,10a are shown in FIG. 1 but it is to be appreciated that the preferred embodiment of the invention incorporates just one power tapping element 8a. In further embodiments of the invention, there can be any number of power tapping elements to tap power at a plurality of locations along the twisted pair 2a.

Figure 2:
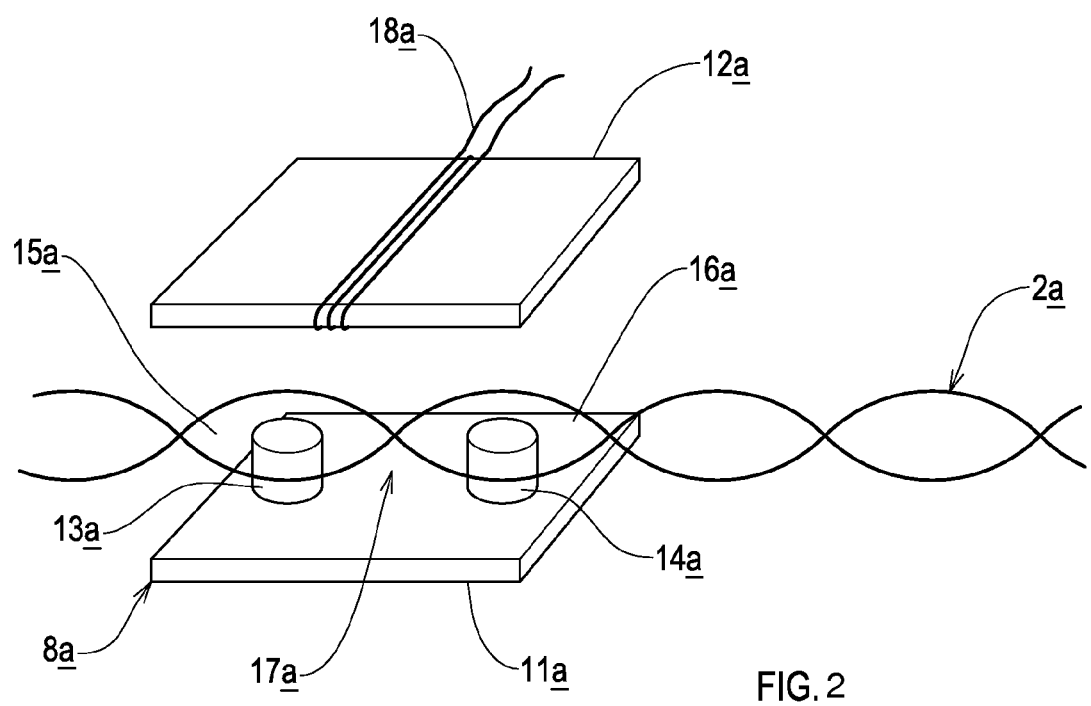

Referring now to FIG. 2 of the accompanying drawings, the power tapping element 8a is of a ferrous material. The power tapping element 8a comprises a rectangular planar base 11a and an identical rectangular planar top plate 12a. Two spaced apart upstanding cylindrical ferrite members 13a,14a are mounted to the top of the base 11a. The tops of the ferrite members 13a,14a are configured to engage and attach to the underside of the top plate 12a so that the ferrite members 13a,14a are sandwiched between the base 11a and the top plate 12a when the power tapping element 8a is assembled.

The top plate 12a is removably attachable to the ferrite members 13a,14a to allow the top plate 12a to be removed, as shown in FIG. 2. The power tapping element 8a is attached to the twisted pair 2a by pushing the ferrite members 13a,14a between adjacent turns of the twisted pair 2a. The conductors 3a,4a between adjacent turns of the twisted pair 2a are thus moved apart from one another to define an aperture therebetween which receives at least part of the power tapping element 8a. When the ferrite members 13a,14a are positioned through apertures 15a,16a in the twisted pair 2a, the top plate 12a is attached to the ferrite members 13a,14a to attach the power tapping element 8a to the twisted pair 2a.

The power tapping element 8a forms the core of a transformer and the loops of the twisted pair 2a which pass around the ferrite elements 13a,14a form a primary coil 17a of the transformer. A further conductor 18a is wound around the power tapping element 8a, preferably around the top plate 12a. The further conductor defines a secondary coil of the transformer. The power tapping element 8a therefore allows high frequency AC power to be tapped off the twisted pair 2a, into the further conductor 18a.

The further conductor 18a is preferably connected to an AC-DC converter 19a which converts the high frequency AC power into a DC voltage to supply a constant current load, such as an LED D1a or an OLED. The AC-DC converter is preferably a synchronous converter of a type which will be discussed below.

Power can be tapped off from the twisted pair 2a by a power tapping element at any point along the twisted pair 2a without breaking the conductors 3a,4a or breaching the insulation of the conductors 3a,4a. The power distribution system provides a contactless connection to a load. It is thus easy to couple power from the twisted pair 2a to a load D1a at any point along the length of the twisted pair 2a.

The twisting of the conductors 3a,4a in the twisted pair 2a results in the electric field of one conductor 3a cancelling the electric field of the other conductor 4a which minimises electromagnetic radiation (EMI) being emitted from the system 1a.

The balanced take-off of power provided by the power tapping element 8a minimises the electric field. The coupling efficiency between the twisted pair and the AC-DC converter 19a is greater than 97%. The transformer formed by the power tapping element 8a and the turns of the twisted pair 2a and the further conductor 18a form a very small transformer which is approximately 10 cm$^3$ in volume. Despite the small size, the transformer has a power rating of 15 W.

The power tapping arrangement of the power distribution system 1a is very cost effective because it performs a transformer and connector function in one unit.

Figure 3:
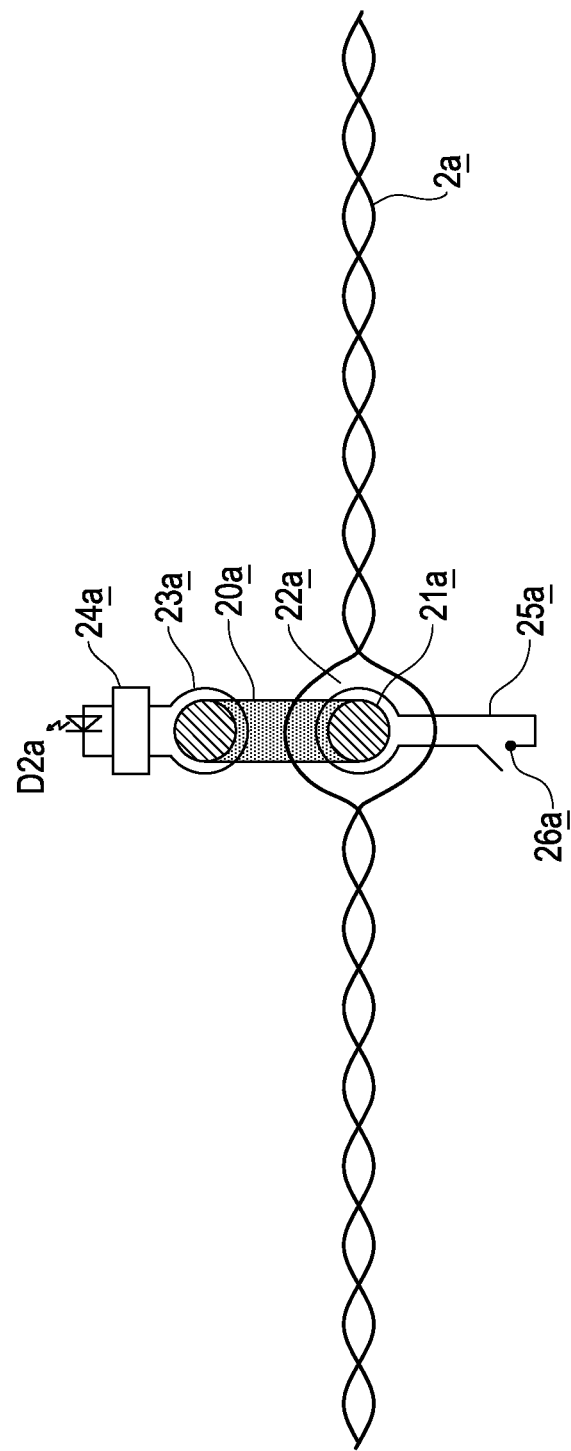

In other embodiments of the invention, the power tapping element is a splittable ferrite element 20a, as shown in FIG. 3. In this embodiment, one ferrite member 21a of the ferrite element 20a passes through an opening 22a in the twisted pair 2a, rather than two ferrite members 13a,15a passing through two openings 15a,16a in the twisted pair 2a as described above. In this embodiment, the loop of the conductors 3a,4a which extends around the ferrite member 21a forms one turn of a primary coil of the power tap-off transformer.

A further conductor 23a is wound around the ferrite element 20a to couple power to an AC-DC converter 24a which in turn powers a load D2a.

In this embodiment of the invention, a shorting loop conductor 25a is wound around the ferrite member 20a. A shorting switch 26a is provided in series with the shorting loop 25a. When the shorting switch 26a is open, the shorting loop 25a has no inductive effect and power is coupled from the twisted pair 2a to the load circuit. When the shorting switch 26a is closed, the shorting loop 25a prevents power from being coupled inductively via the ferrite member 20a to the load circuit, thereby switching off the load circuit. When the load circuit is switched off using the shorting loop 25a and the shorting switch 26a, there is negligible energy loss from the twisted pair 2a since no power is coupled inductively from the twisted pair 2a to the load circuit. In some embodiments, the shorting switch 26a is an electronic switch which draws power from its own inductive coupling to a loop of the twisted pair 2a.

Figure 4:
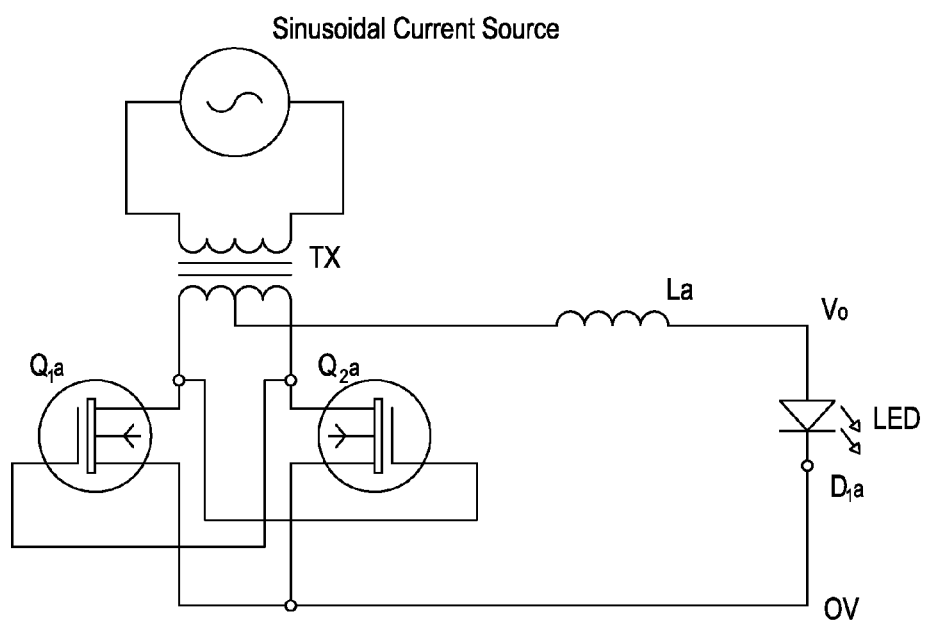

Referring now to FIG. 4 of the accompanying drawings, a synchronous rectifier circuit for use as an AC-DC converter in embodiments of the invention incorporates a first MOSFET switch Q1a and a second MOSFET switch Q2a. The drains of the switches Q1a and Q2a are connected respectively to each end of a secondary coil of a transformer TX.

The primary winding of the transformer TX equates to loops of the twisted pair 2a which are connected to a high frequency, high impedance, AC power source which alternates with a limited rate of change of current.

The drains of the switches Q1a and Q2a are connected respectively to each end of a secondary coil of a transformer TX. The secondary winding of the transformer TX equates to the further conductor 18a in the power distribution arrangement 1a. The core of the transformer TX equates to the power tapping member 8a.

The minimum rate of change of current of the high impedance power source is twice the peak to peak amplitude of the current divided by the period of the current wave. This is equivalent to the slope of a triangular wave.

The maximum rate of change of current of the high impedance power source is ten times the peak to peak amplitude of the current divided by the period of the current wave. This is equivalent to a square wave with transitions taking 10% of its total period.

The high frequency AC power source preferably provides a voltage of between 150V and 1 kV, at an operating frequency of greater than 10 kHz, but most preferably at a frequency of 60 kHz.

The gate terminal of the first switch Q1a is connected to the drain terminal of the second switch Q2a. The gate terminal of the second switch Q2a is connected to the drain terminal of the first switch Q1a.

The source terminals of the switches Q1a and Q2a are connected to one another and to a low voltage rail 0V which defines one output terminal.

One terminal of an inductor La is connected to a centre tap of the secondary coil of the transformer TX. The other terminal of the inductor La defines a positive DC voltage output rail Vo. A load $D_1a$ in the form of an LED is connected between the output terminals Vo and 0V. The power supply 3a outputs a constant current to the load $D_1a$. The load $D_1a$ limits the output voltage V0 such that the control voltage which drives the gates of the switches Q1a,Q2a is maintained within a suitable range for the switches Q1a,Q2a, for instance less than 10-15V.

The power supply 3a does not require a drive circuit because the gate of each switch Q1a,Q2a is driven by the drain of the other switch Q1a,Q2a.

The power supply 3a does not incorporate current sense resistors. These expensive and inefficient components are thus eliminated.

No deadband operation is needed by the power supply 3a. The power supply 3a is therefore more efficient than conventional synchronous rectification power supplies which require deadband operation.

Cross-conduction within the switches Q1a and Q2a is limited to only very small currents which further improves the efficiency of the power supply 3a.

Body diode conduction within the switches Q1a and Q2a is kept to a minimum which minimises energy loss since only very small currents are able to flow by body diode conduction within the switches Q1a and Q2a.

Figure 5:
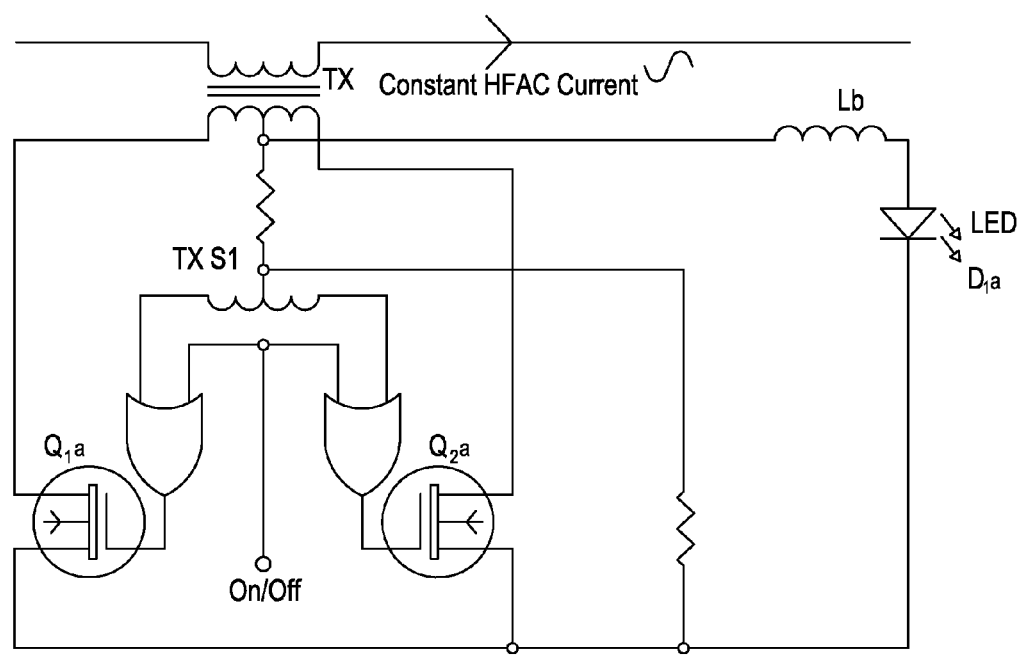

Referring to FIG. 5 of the accompanying drawings, a modified synchronous rectifier circuit incorporates switches Q1a, Q2a with gates which are driven respectively by OR gate logic. One input of each OR gate is connected to a respective end of a secondary winding TXS1 which is one of the two windings of the twisted pair 2a that surrounds one of the ferrite members 13a,14a of the power tapping element 8a. The other input of each OR gate is connected to a switch. The switch provides an ON/OF toggle which can short out the secondary winding of the transformer TX. This allows the load to be switched on and off at zero crossing which reduces electrical disturbances along the twisted pair 2a. There are two MOSFET losses in the switches Q1a,Q2a but no core losses in the transformer TX. The rectifier switches can therefore switch the DC load with high efficiency.

The coupling transformer formed by the power tap off arrangement in embodiments of the invention can match to any required load current. Each load along the power distribution system 1a can be controlled independently by simply shorting out the inductive power tap off, for instance using rectifiers, as shown in FIG. 5.

The power distribution system can be used to create a single power supply with multiple different regulated loads. This is an improvement over conventional approaches where many switching inverters are required to provide power to the different regulated loads. For instance, the power distribution system 1a can be used to provide power to many different designs of LED luminaire which output different coloured light or different beam patterns.

The power distribution system 1a is capable of providing power to luminaires which have a large number of LEDs or OLEDs, whilst still preserving the low voltage classification and/or fault tolerance.

Figure 6:
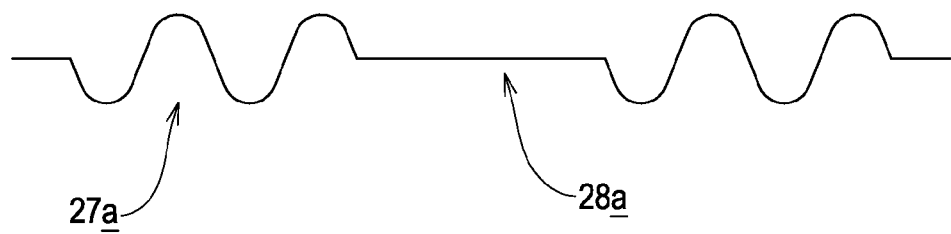

The power distribution system 1a can incorporate a pulse density modulation (PDM) arrangement to modulate a current waveform 27a to drop pulses over a period of time 28a, as shown in FIG. 6. PDM can be used to dim LEDs or OLEDs connected to the power distribution system 1. The PDM arrangement allows 250 steps of brightness for a 200 Hz LED flicker rate.

The current loop power in the twisted pair 2a can be distributed over many LED luminaires positioned along the length of the loop.

Connecting transformer coupled loads in series can share a single current loop power supply.

A constant current loop is indifferent to loop voltage drops. Load currents remain regulated by the loop current.

The brightness of each luminaire remains constant for a large area without the need for local regulation.

A Power Supply

Figure 9:
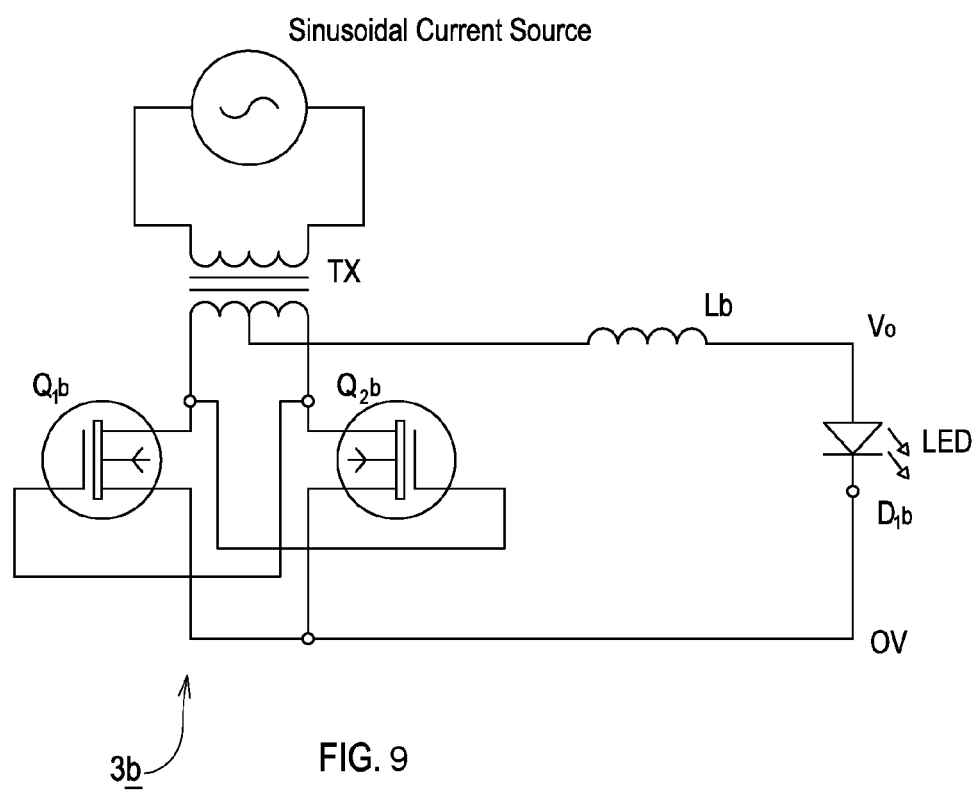

Referring now to FIG. 9 of the accompanying drawings, a power supply in accordance with a preferred embodiment of the invention incorporates a first MOSFET switch Q1b and a second MOSFET switch Q2b. The drains of the switches Q1b and Q2b are connected respectively to each end of a secondary coil of a transformer TX. The primary coil of the transformer TX is connected to a high frequency, high impedance, AC power source which alternates with a limited rate of change of current.

The minimum rate of change of current of the high impedance power source is twice the peak to peak amplitude of the current divided by the period of the current wave. This is equivalent to the slope of a triangular wave.

The maximum rate of change of current of the high impedance power source is ten times the peak to peak amplitude of the current divided by the period of the current wave. This is equivalent to a square wave with transitions taking 10% of its total period.

The high frequency AC power source preferably provides a voltage of between 150V and 1 kV, at an operating frequency of greater than 10 kHz, but most preferably at a frequency of 60 kHz.

The gate terminal of the first switch Q1b is connected to the drain terminal of the second switch Q2b. The gate terminal of the second switch Q2b is connected to the drain terminal of the first switch Q1b.

The source terminals of the switches Q1b and Q2b are connected to one another and to a low voltage output 0V which defines one terminal of an output from the power supply 3b.

One terminal of an inductor Lb is connected to a centre tap of the secondary coil of the transformer TX. The other terminal of the inductor Lb defines a positive DC voltage output rail Vo at the output of the power supply 3b. A load $D_1b$ in the form of an LED is connected between the output terminals 0V and Vo of the power supply 3b. The power supply 3b outputs a constant current to the load $D_1b$. The load $D_1b$ limits the output voltage Vo such that the control voltage which drives the switches Q1b,Q2b is maintained within a suitable range for the switches Q1b,Q2b, for instance less than 10-15V.

Figure 7:
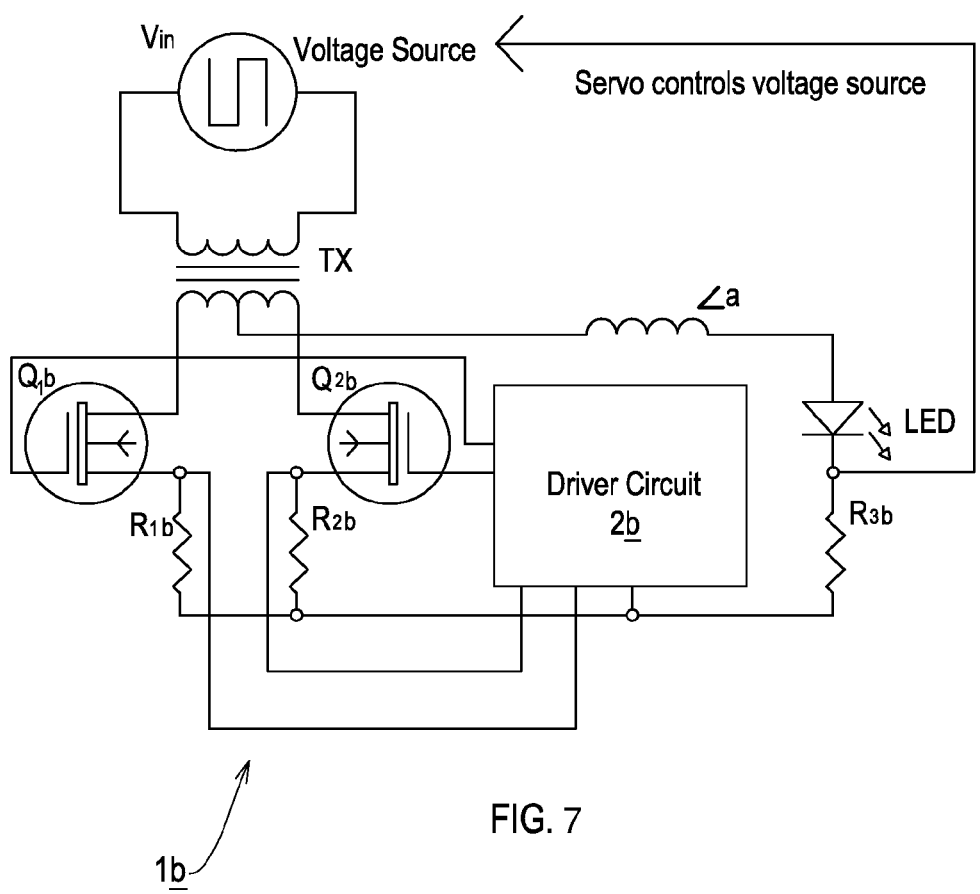
Figure 8:
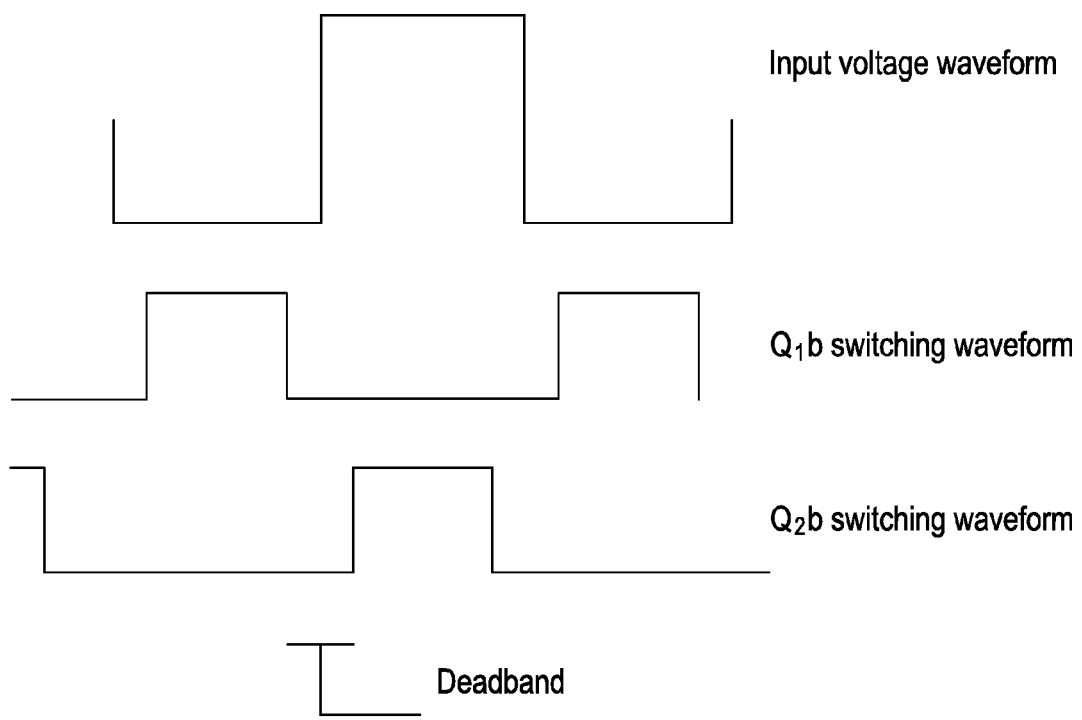

The power supply 3b does not require a drive circuit because the gate of each switch Q1b,Q2b is driven by the drain of the other switch Q1b,Q2b. The power supply 3b is thus less complex than the conventional power supply circuit 1b shown in FIG. 7.

The power supply 3b does not incorporate current sense resistors. These expensive and inefficient components are thus eliminated.

No deadband operation is needed by the power supply 3b. The power supply 3b is therefore more efficient than conventional synchronous rectification power supplies which require deadband operation.

Cross-conduction within the switches Q1b and Q2b is limited to only very small currents which further improves the efficiency of the power supply 3b.

Body diode conduction within the switches Q1b and Q2b is kept to a minimum which minimises energy loss since only very small currents are able to flow by body diode conduction within the switches Q1b and Q2b.

Figure 10:
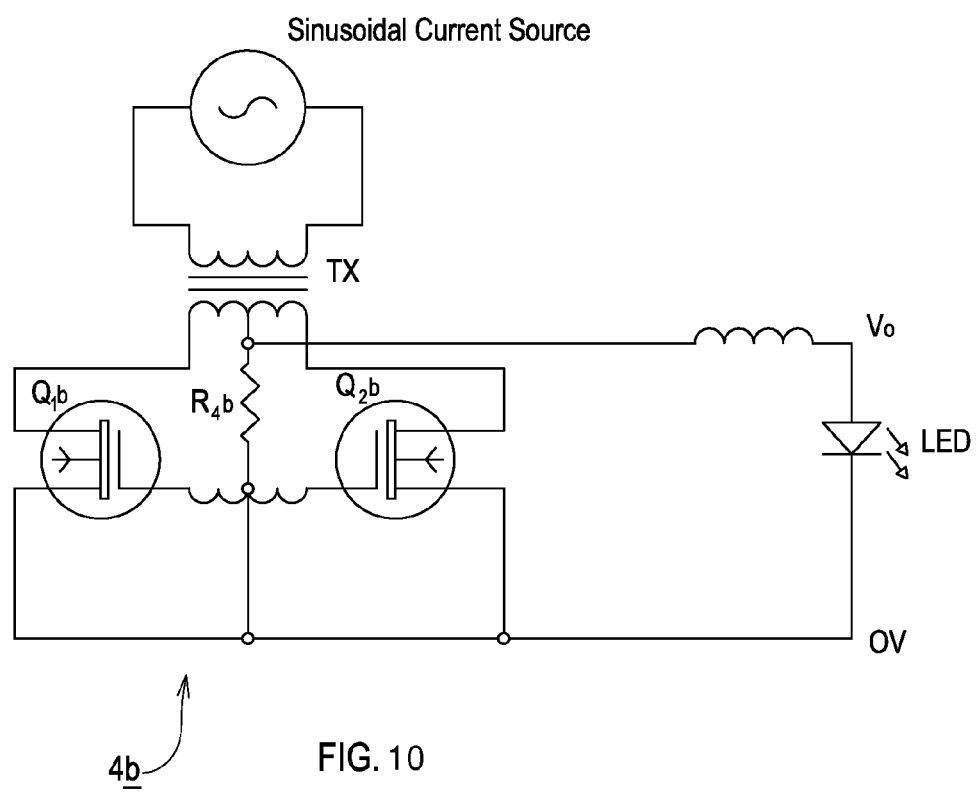

Referring to FIG. 10 of the accompanying drawings, a power supply 4b in accordance with a further embodiment of the invention incorporates some of the same components as the components of the preferred embodiments discussed above. The gate terminals of the switches Q1b,Q2b are, however, connected differently.

The gate terminal of the first switch Q1b is connected to one end of a separate drive winding TXS1 of the transformer and the gate terminal of the second switch Q2b is connected to the other end of the drive winding TXS1. A centre tap of the drive winding TXS1 is connected via a resistor R4b to the centre tap of the secondary coil of the transformer TX. The centre tap of the drive winding TXS1 is connected to the sources of the switches Q1b,Q2b.

The number of turns of the drive winding TXS1 is selected so that the drive winding TXS1 feeds a drive voltage at an acceptable level into the gates of the switches Q1b,Q2b, for instance a voltage of less than 10-15V. The number of turns of the drive winding TXS1 is preferably less than the number of turns of the secondary winding of the transformer TX to reduce the voltage from the transformer TX to a level which is suitable to drive the gates of the switches Q1b,Q2b. This allows the output load voltage V0 to be higher than the gate drive voltage which is input to the switches Q1b,Q2b.

Figure 11:
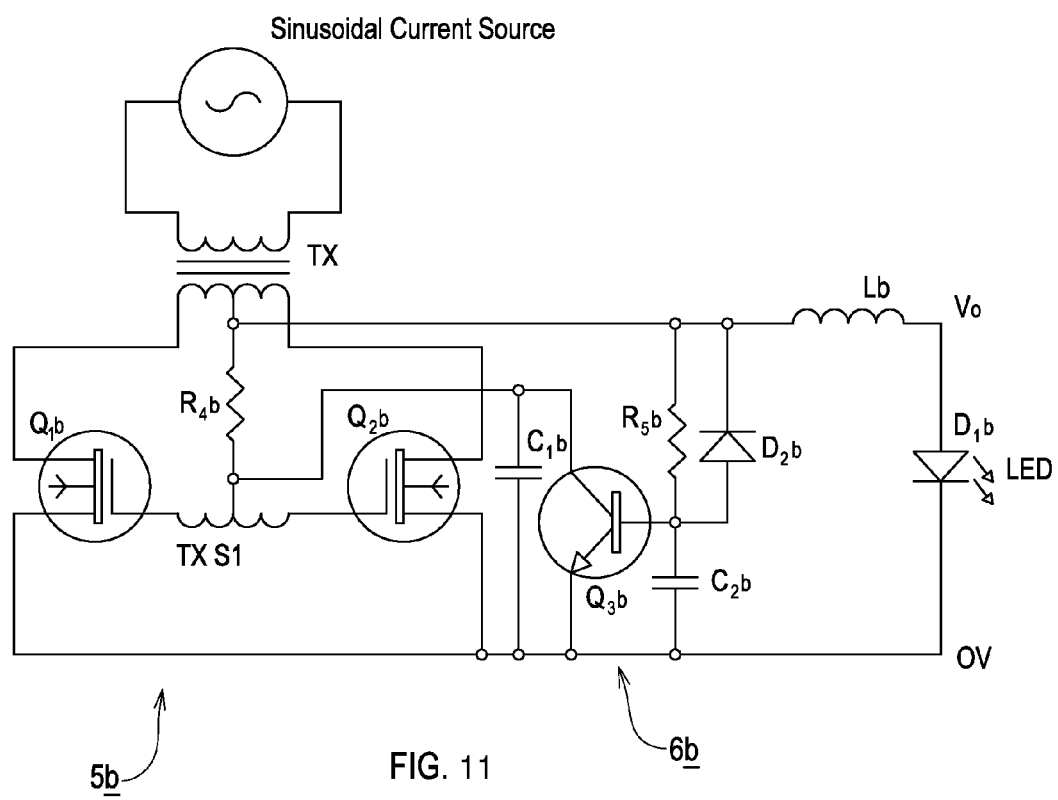

Referring to FIG. 11 of the accompanying drawings, a power supply 5b in accordance with a yet further embodiment of the invention is similar to the further embodiment described above and shown in FIG. 10. However, in the power supply 5b of this further embodiment the centre tap of the drive winding TXS1 is not connected to the sources of the switches Q1b,Q2b but is instead connected to an automatic biasing circuit 6b.

The automatic biasing circuit 6b comprises a transistor Q3b, two capacitors C1b,C2b, a resistor R5b and a diode D2b. The biasing circuit 6b detects and eliminates any body diode conduction in the switches Q1b,Q2b. This allows the power supply 4b to approach the theoretical maximum efficiency and allows the power supply 4b to accommodate higher load voltages Vo.

Figure 12:
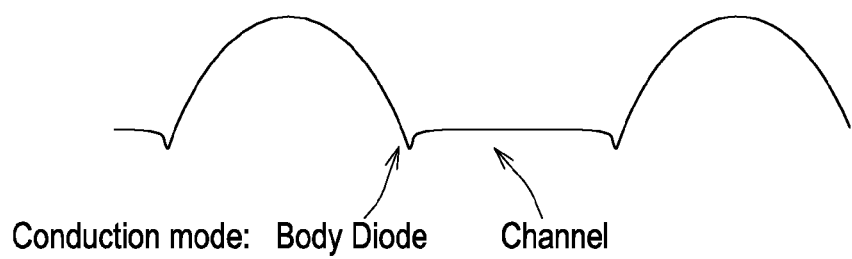

Referring now to FIG. 12 of the accompanying drawings, the drain voltage waveform for one of the switches Q1b,Q2b is shown for the power supply 3b of the preferred embodiment described above. A small downwardly facing spike due to body diode conduction can be seen at each end of the conduction mode. This represents a small amount of power which is wasted during body diode conduction.

Figure 13:
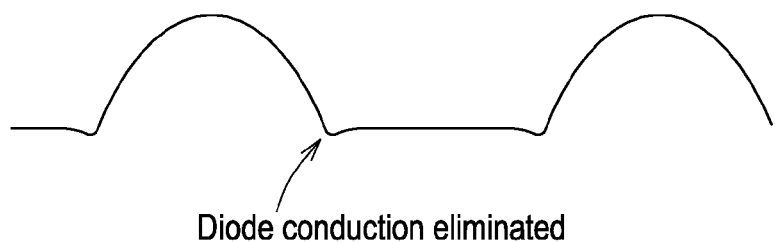
Figure 14:
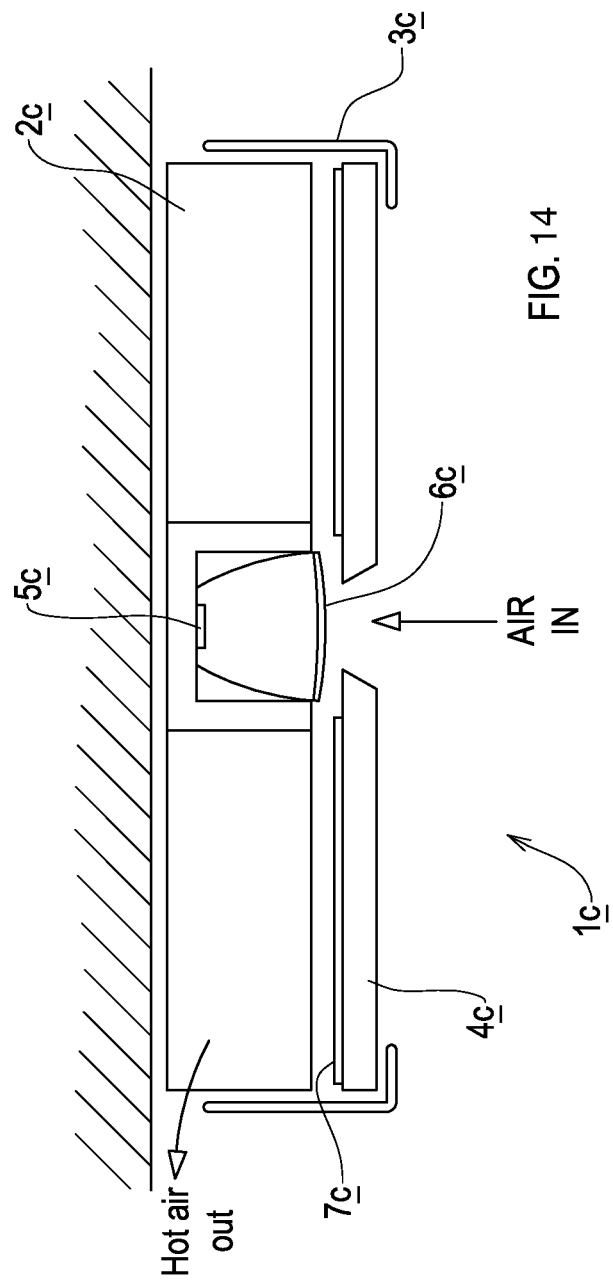
FIG. 14 is a schematic side view of a luminaire embodying the invention.
Figure 15:
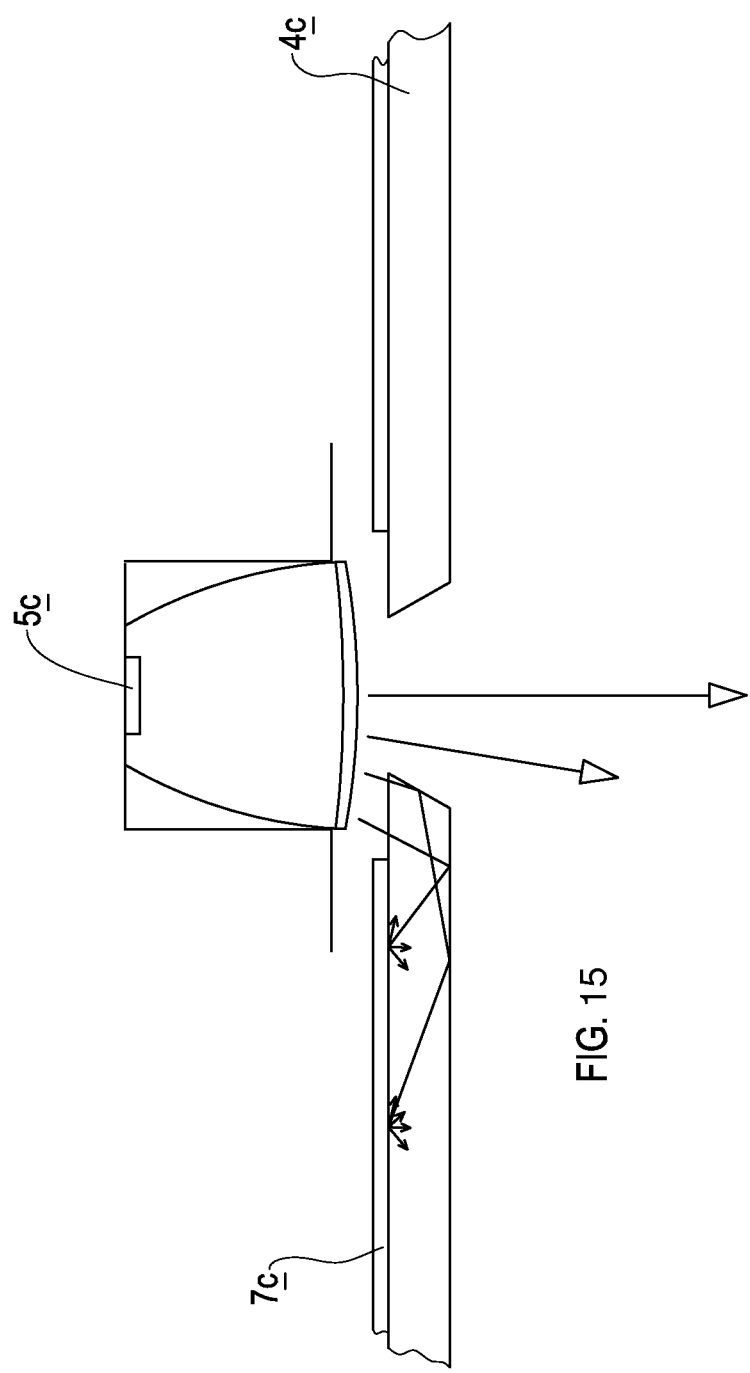
FIG. 15 is a schematic side view showing the optic pathways for the luminaire of FIG. 14.

Referring to FIG. 13 of the accompanying drawings, the body diode conduction spike has been eliminated by the automatic biasing circuit 6b in the power supply 5b of the yet further embodiment described above. The efficiency of the power supply 5b is therefore maximised.

Power from the transformer TX in the power supply of embodiments of the invention may be gated to the load D1b by turning both switches Q1b and Q2b on simultaneously. This creates a high impedance power source which leads to complete collapse of voltage across the transformer TX which in turn leads to minimal power loss in the power supply.

The free, nominally lossless, gating of power to the load D1b by turning both switches Q1b and Q2b on allows independent control of each of a plurality of loads connected to the output of the power supply which are all fed from the same high impedance source. For instance, the multiple loads might be contained within a single unit or distributed loads in separate discrete units. The multiple loads might, for instance, be LED light sources of differing colour.

Gating power to the output load allows Pulse Density Modulation (PDM) to be used to vary the effective power output to the loads. This allows load dimming, for instance to vary the brightness of an output LED. This overcomes the problems suffered by conventional LED power supplies where it becomes very complicated if multiple regulated outputs are required.

A Luminaire

Referring to FIGS. 14 to 23, a luminaire 1c in accordance with an embodiment of the invention exploits the efficiency and cost effectiveness of compact LED or OLED optics, making provision for a large heatsink 2c, which is masked from view by a side surrounding and concealing trim 3c and a masking 4c in the form of an optical component. In one embodiment the mask 4c is a glass plate that takes a fraction of the light from a central beam from an LED 5c (responsible for the major part of the downlighting) and uses it to create a moderately illuminated and extensive surface.

In the illustrated embodiments the beam from the LED 5c is centrally located at the centre of a disc-shaped optic 4c. The LED light source 5c (or a compact array of light sources) can also be provided in a linear configuration. It is important however that a first portion of the light from the LED source 5c is substantially uninterrupted by the optic 4c. In this embodiment the first portion of light passes through an aperture in the optic 4c. A second portion of the light from the LED source 5c deliberately feeds through the optic 4c which provides a portion of the mask to conceal the heatsink 2c behind the mask from a casual viewer. In this sense the second portion of light from the LED source 5c is interrupted by the optic 4c.

A diffuser 6c may be provided over the LED source 5c and in line with the aperture in the optic 4c.

The second portion of light from the LED source 5c is located at a peripheral area of the first portion of light. In the central configuration which offers a very uniform dispersion of light in the mask, the first portion of light is central to the optical disk 4c which has an opening to allow the first portion of light to pass through the mask. The second portion of light (at the periphery of the first portion) refracts into the optical disk passing from the LED 5c through an optional backing surface 7c of the optical disk into the disk. The glass disk 4c operates as a light pipe or wave guide, using total internal reflection to bounce light towards the outer reaches of the disk 4c. Light escapes by striking the optional white backing material 7c (which may be screen printed on the disk) and being dispersed in all directions. If a backing material 7c is used for this function, then there should be no air gap between the optical disk 4c and the backing material 7c or the light will remain trapped in the glass.

Only shallow angle light is totally internally reflected (TIR) in the optic 4c, so the light inputted at the centre will TIR if shallow (the widest angle part of the main beam). Steeper angled light will TIR off the bevelled aperture surface of the optic 4c and become suitably shallow to travel further towards the edge of the glass disk. Of the light scattered off the backing approximately half is further TIRed and half escapes downwards.

An opportunity is created at the aperture in the centre of the optic 4c which allows the main LED beam egress, to allow airflow ingress to cool the masked heatsink fins 8c above the optic 4c. Heated air from the fins 8c is subsequently allowed to escape around the top of an edge, masking trim 3c. The fins 8c are arranged radially to encourage a radial heat flow radially outwardly away from the LED light 5c and heat source.

Figure 16:
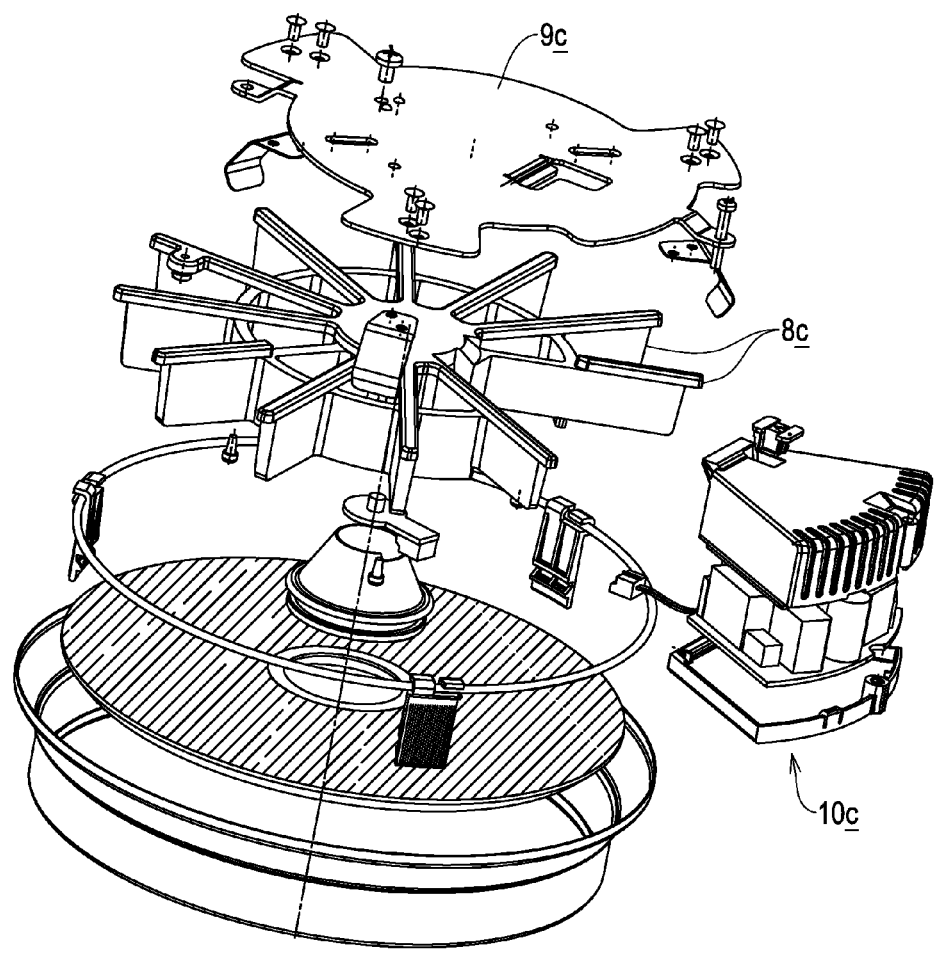
FIG. 16 is an exploded perspective view of a luminaire embodying the Invention.
Figure 18:
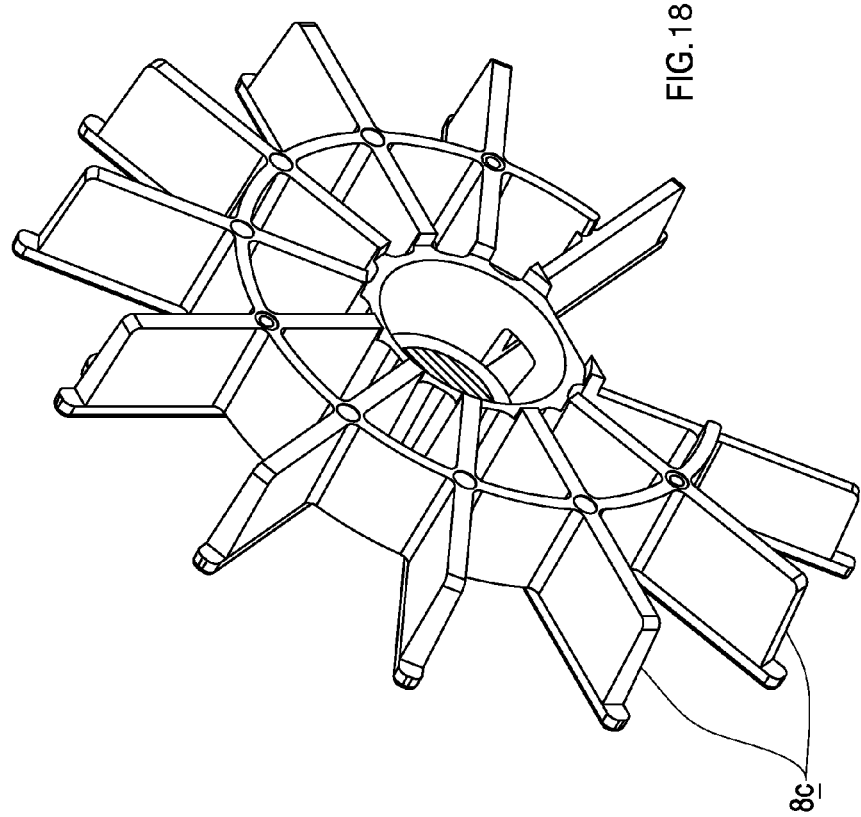
Figure 17:
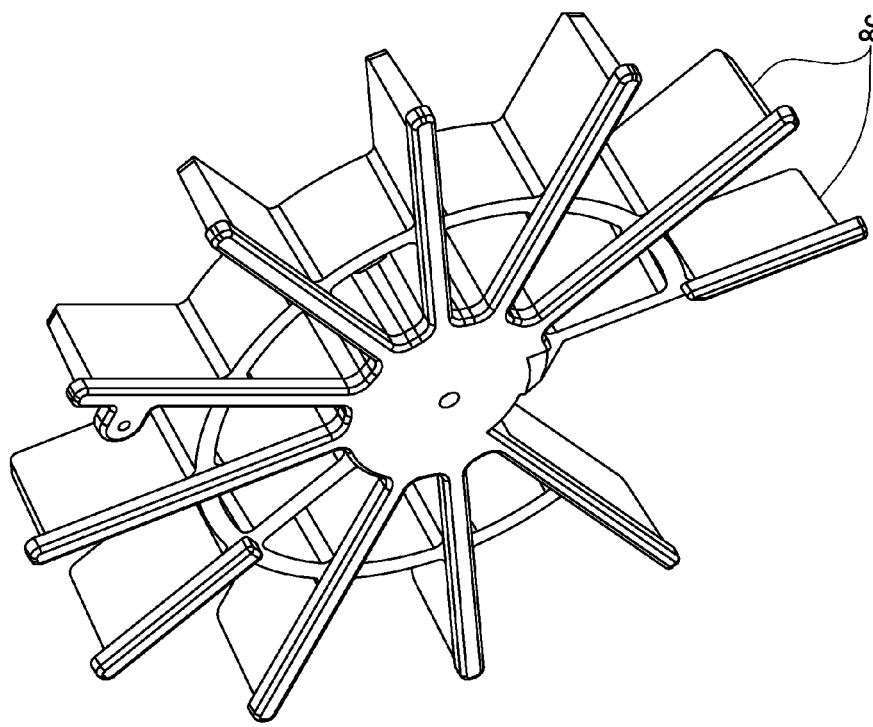
Figure 21:
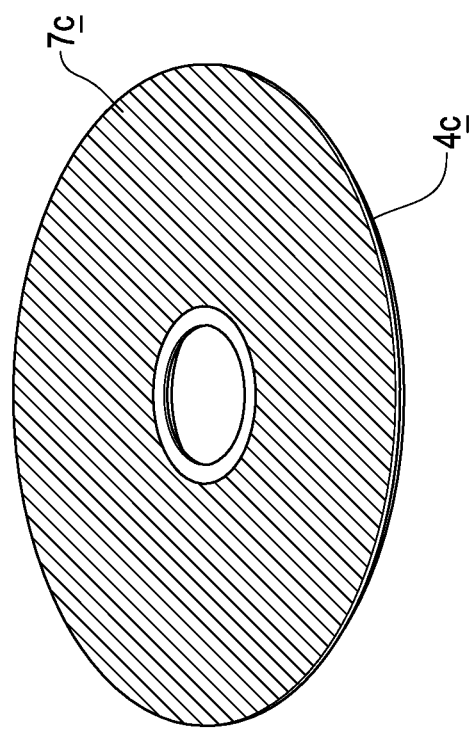

The overall visual effect is to create a luminaire similar in visual characteristics to a compact fluorescent lamp downlighter, but in an optically efficient and very low profile package with excellent heatsink characteristics to deal with the heat generated by the LED source and also the power supply shown as a block of components mounted on a wedge shaped printed circuit board 9c in FIG. 16.

The radial heatsink fins 8c offer a very convenient segment within which a wedge-shaped power supply 10c can fit, also masked by the optic 4c.

The LED backing plate 9c on which the LED source 5c or LED compact array source is mounted can be part of the heatsink assembly for excellent thermal conduction or can be, as illustrated, in thermal contact with heatsink 2c.

There is an intentional gap between the top of the outer concealing trim 3c and the ceiling (or wall) so that a vent is provided through which hot air can flow. There is an element of a chimney effect with the configuration of the aperture in the centre of the optical disk 4c at the lowest part of the luminaire 1c (for a ceiling mounted configuration) and the radially spaced vents around the periphery and top of the luminaire 1c. The central low aperture draws in cooler air which travels along the lengths of the radial fins 8c taking the heat away from the fins 8c towards the trim and up and out of the vents.

The luminaire 1c illustrated has an outer diameter in the region of 200 mm. The diameter of the aperture in the disk is in the region of 37 to 45 mm.

The diffuser 6c on the LED chamber front above the aperture (and spaced apart therefrom to improve airflow) may be a random rough surface diffuser 6c or a lenticular (beam widening through refraction) diffuser. The diffuser 6c may be omitted altogether.

The backing 7c to the optic 4c may be screen printed on the glass disk and/or may have a pattern added to make the apparent illumination on its surface more uniform.

The aperture in the optic 4c is illustrated as circular but can be any shape or a cut-away in a side or edge of a mask.

A Power Supply

Summary

An AC to DC power supply whose output is in the form of a regulated DC current, suitable for supplying power to a DC load of nominally fixed voltage characteristic, e.g. a light emitting diode, such that its output current remains substantially unchanged with any modest variation of said fixed voltage characteristic. Further, the magnitude of said regulated current is variable over a range of 100% to below 25% (10%, 5%, 1%) in response to the conduction phase angle of its AC input voltage. The regulation of said DC output current is effected by the ballasting of a symmetrical square wave by an inductor and the subsequent full-wave rectification and smoothing of this comparatively high impedance AC current source.

The incoming AC power is rectified and has its conduction phase angle assessed. The DC so obtained is inverted into a symmetrical square wave of high frequency 20 kHz to 100 kHz or 250 kHz to 2 MHz. The magnitude of the current produced when this is ballasted by an inductor is controlled by controlling either the amplitude of the square wave or its frequency or both in combination.

In order to achieve the wide range of output currents required (down to low levels) the voltage threshold characteristic of the load is exploited, thus as the effective voltage of the power source approaches the nominal operating voltage of the load its operating current can be made to fall to near zero. The output current control is exercised in response to the input conduction phase angle in such a manner as to always ensure the output power is less than the power supplied within said input conduction angle.

EXAMPLE 1

Referring to FIGS. 24 to 25 of the accompanying drawings, a first embodiment of the invention uses a standard Power Factor Correction (PFC) input circuit. This allows the input to appear to have the characteristics of a simple resistor which allows simple phase angle controllers to work better.

The DC link voltage (the voltage at the output of the PFC module) is regulated to a voltage always above the maximum peak voltage of the AC input. The level above this minimum level can be adjusted as required to define the chosen DC output current. The minimum level of this DC link voltage is used as the level at which the output current will be zero or near zero. The load is coupled via a transformer to the ballasting inductor. By choosing a suitable turns ratio of the transformer the threshold voltage of the load at the secondary can be reflected back on the primary as a voltage similar to the minimum allowed DC link voltage.

The minimum allowed link voltage may be 191 Volts DC for a US line/mains supply of 120V (135V times root 2). The load threshold voltage (the voltage at which it begins conduction) may be 20 volts. In the circuit of FIG. 24 the transformer has a turns ratio of 5 to 1 (primary to secondary) resulting in the need for a 200 volt square wave into the primary before conduction in the load can even begin.

By varying the value of the DC link voltage that feeds the half bridge inverter, the amplitude of the HFAC squarewave at the primary can be varied from this cutoff value of 200 volts to some higher value, say 300 volts. (It is desirable not to allow the voltage to go too high because of the costs of the components involved.) The value of the inductor can now be set. The maximum current in the secondary, say 500 mA, requires a maximum primary current of 100 mA. The reactance of the inductor is chosen to produce this current in the primary at the operating frequency and given the maximum peak to peak voltage across it of 100 volts (300-200 volts).

EXAMPLE 2

Referring now to FIGS. 27 and 28 of the accompanying drawings, a second embodiment of the invention again uses a PFC to provide a DC link voltage. This time it is fixed in value. The frequency of the inverter is varied to alter the current flow through the ballasting inductor. Because the current only varies in inversely proportional to the frequency, to obtain a useful range of control, a large range of frequencies would be needed to achieve the desired range. The effect can be enhanced by making the inductor resonant or partially resonant with a capacitor connected in parallel with the transformer primary. The resonant frequency is selected to be below or just below the lowest chosen operating frequency.

Selecting 50 kHz as the lowest frequency and a combination of ballasting inductor and resonant capacitor of 46 kHz, a control range of 100% down to 2% can be achieved in the range 50 to 80 kHz.

As before the input phase angle is used to define the output current by suitably adjusting the frequency of the inverter.

EXAMPLE 3

Referring now to FIGS. 29, 31, 32 and 33 of the accompanying drawings, in a third embodiment of the invention the PFC stage is omitted entirely and the DC link rail is unsmoothed and varies at twice the input power frequency between zero and maximum. The inverter drives a resonant arrangement like the above. If the inverter operates at or near the resonant frequency the input current to the inverter tends to remain constant as the input voltage varies. The resonant ballasting arrangement produces a current in the load that varies proportionally with the input voltage to it. (At resonance even the smallest of input voltages "rings up" to begin driving the (fixed voltage) load.) In consequence the power to the load is nominally sinusoidal, despite its threshold. As the input voltage is sinusoidal the input current must be constant as the ballasting arrangement is nominally lossless.

This is a very attractive state of affairs as, though the load is not unity power factor, it is surprisingly high, plus it has the advantage of providing disproportionately high input currents at the start of the mains cycle.

This high initial current overcomes a major problem of LED luminaire ballasts in being typically low in power and too low to operate successfully of a standard phase control dimmer. These dimmers require a minimum loading to ensure their thyristor control elements remain conductive. Increasing the input current at the start of the voltage wave front aids the holding current of the thyristor ensuring proper operation at lower than expected powers.

In this instance the conduction phase angle itself substantially regulates the power, though additional control can be provided by modest control of the operating frequency.

Note operation at resonance is not feasible outside a self oscillating arrangement. Operation just above resonance is the likely stable arrangement and the input current waveform will approximate between a squarewave and a sinewave.

EXAMPLE 4

Referring now to FIGS. 29, 32, 33 and 34 of the accompanying drawings, example 4 is a modified version of example 3 described above in which the approximated input squarewave current of embodiment 3 can be further "squared off" to enhance the effect of a high initial current. This is done by altering the frequency of operation throughout the input frequency half cycle, as shown in FIG. 34. Hence the unit is run near resonance when the input voltage waveform is low. As the input voltage increases the inverter frequency is increased also, counteracting somewhat the effect of the increased input voltage on load current. Turning to FIG. 35, the current in the load become more nearly square (when looked at with respect to the input power frequency)—this gives a constant power draw. Further, the smoothing of the output DC current is easier, becoming as it does nominally constant with brief dips in the zero crossing region of the input power frequency.

The input current can now be made more nearly flat without actually operating too near resonance. It may even be made to have a "dogbone effect" (higher start and finish than middle, as shown in FIG. 32) which can further enhance phase controller function.

Downlighter Power Supply

A power supply in accordance with a preferred embodiment of the invention will now be described with reference to FIG. 37 of the accompanying drawings.

FIG. 36 shows a schematic simplified version of the circuit of FIG. 37. The luminaire power supply and the loads of the luminaire, comprising at least two LEDs or OLEDs, are supplied and packaged as a single unit, the elements of the power supply being "distributed" within the single unit.

The distribution of the power supply elements provides excellent redundancy should one or more of the many LED/OLED loads in the luminaire fail. The secondary windings are independent of one another and each supply power to a respective load.

The secondary windings are independent of one another but are coupled to the same primary windings. This allows the constant DC current supplied via a respective secondary winding to be tailored to the respective load associated with that winding. Hence, if two secondary windings have a different number of turns, the value of the constant DC current supplied to the respective loads will also be different.

Broadly speaking, embodiments of this invention have a luminaire housing and the loads comprise the individual lighting elements within the luminaire. The luminaire also includes all of the elements of the power supply. Thus, embodiments of the invention comprise an electrical arrangement comprising a power supply and at least two loads to be powered by the power supply, the power supply configured to produce intermediary power in the form of a predetermined regulated high frequency alternating RMS current waveform, said current flowing through the separate primary windings of at least two coupling transformers, the secondary windings of which are, independently of one another, each connected to a respective one of the loads and are each adapted to supply a predetermined current to the respective load via one or more rectifiers.

Preferably the frequency of the high frequency current is: 10 khz to 1 MHz; 20 kHz to 200 kHz; 50 kHz-100 kHz.

One or more of the loads are regulated to a lower average power by the periodic operation of a shorting switch. The periodic operation of the shorting switch can drive the switch with a pulse width modulated signal to allow dimming of an LED/OLED load.

Conveniently the or each rectifier is a synchronous rectifier. The periodic operation of the shorting switch may be provided by simultaneous conduction of the synchronous rectifiers.

The coupling transformers have soft magnetic cores which are operated at a sufficiently high flux such that, upon any open circuit failure of its load, the core will saturate leaving the intermediary current and any alternate load substantially unaffected by the failure.

A high flux is anything above one third of the saturation flux density of the core for any one of the coupling transformers.

If one of the loads fails open circuit, then this will result in the operation of the shorting switch. Further, a load failing will result in the simultaneous conduction of the synchronous rectifier devices.

Dimming or relative brightness of the loads is adjusted by periodic switching of the shorting switch at one or each of the loads and/or the overall brightness is adjusted through adjusting the magnitude of the intermediary constant current, high frequency alternating waveform.

Circuit Intent
1. To achieve "Instant-On" performance.
2. To produce a constant maximum output power around the nominal load point.
3. To produce a variable constant current into an LED load, regulated according to the setting of a Phase-Cut or phase-angle-conduction dimmer.
4. To have the same maximum brightness using a dimmer as when using a direct connection.
5. To avoid "across the isolation barrier" signalling.
6. To achieve a very high conversion efficiency.

As this approach is dissipative, the downlighter design uses a Boost-type power-factor correction circuit that causes input current to be drawn whenever AC voltage is present.

Output Inverter

The output inverter is a self-oscillating half-bridge design using an isolating transformer.

Refer to circuit diagram L35SS4F shown in FIG. 37.

Q1/Q2 are a complementary pair of NPN/PNP transistors. Ideally these are of high gain and high voltage capability with moderate "storage" time. Super-fast transistors are less suitable for this design.

Q1/Q2 share a common base-drive circuit comprising C2/L2, C5, R1 R2, D8 D9, R3 R4.

C2 L2 form a resonant tank circuit whose constants are chosen such that:

The resonant frequency is ¾ that of the desired frequency of operation.

The peak current seen in L2 is approximately half the peak collector currents seen at Q1 and Q2.

R1, R2 are chosen to provide suitable amplitudes of forward base current for the circuit.

D8, D9 are base-turn-off speed-up diodes that conduct when the voltage at C5/R1/R2 junction falls to zero volts with respect to the Q1 Q2 emitter voltages.

C5 is a DC blocking capacitor that is chosen to "trim" the final frequency of oscillation and to equalise the conduction times of Q1 and Q2.

R3 R4 supply a very small "bleed" current to provoke Q1 Q2 into oscillation rather than relying upon circuit leakage to achieve this aim.

Bipolar transistors are subject to a number of undesirable characteristics when used as high frequency switches:

"Dynamic Saturation": When switching an inductive load or constant current, the first few microseconds of conduction can result in collector to emitter voltages far in excess of the steady state value (sometimes as high as 18V). This can result in high average dissipation in even moderate frequency applications.

"Storage Time": When the base current is reduced to zero, the transistor can continue to conduct for some period of microseconds whilst slowly developing a voltage between collector and emitter. This is inefficient.

"Leakage": Even in the blocking condition, transistors can pass small amount of current. With a high voltage across them, this small current can nevertheless represent some, not inconsiderable, dissipation. Turning off transistors quickly, but sub-optimally, can result in fast switching, but high leakage. A minimum dissipation switching scheme is to turn off the base current from its DC conduction level to a negative level equal to half the collector current with a constant rate over the nominal storage time. This results in fast collector emitter turn off with minimal leakage resulting in highest overall switching efficiency.

This base drive circuit approaches that ideal with a minimum number of components.

The source voltage to the drive circuit is a square wave in volts derived from the subsequent circuit elements and is therefore frequency locked to Q1 and Q2. The maximum voltage amplitude is chosen so as not to exceed the reverse base voltage capability of the transistors Q1 and Q2.

An inductor L1 is placed in the path to the primary of the isolating transistor TX1. This causes the transistors Q1 and Q2 to begin to conduct from zero with a controlled rate, resulting in minimal dynamic saturation losses.

D5, D6 are commutating diodes that prevent reverse conduction of Q1 and Q2. Their action is to further reduce dissipation in those switching devices.

TX1 has a single section primary winding in conventional manner and has a centre-tapped secondary winding configuration using half-wave rectification provided by D15, D16. C7 is the output filtering capacitor chosen to minimise output ripple voltage caused by the non-DC waveform from TX1.

The output current from TX1 is triangular in form, with an average value of half the peak value. The current naturally passes through zero every half cycle, at which point the transformer reverse in voltage. This results in electrically quiet diode switching with minimal switching loss.

C6 is the normal half-bridge splitter capacitor. Its purpose is to provide a potential approximately equal to half the DC link voltage and to prevent saturation of TX1 due to time imbalances in the switching of Q1 and Q2. D11, D12 and R25 form a half-wave rectified monitoring circuit so that the average voltage at R25 represents the average current seen in the primary of TX1.

The output current is proportional to the voltage seen across L1. Circuit constants are chosen for a particular LED load such that this voltage, at full output power, is half the voltage between Q1/Q2 and C6. Analysis shows that this operating point results in the output power being a local maximum. As it is operating at an inflexion point, the deviation in power away from the ideal caused by variation in LED voltage is small, but nevertheless results in a reduction leading to thermal stability.

Power Factor Correction Circuit

The power factor correction is circuit typical of the "transition-mode boost converter" type and will be familiar to practitioners of the art. It is based upon the L6562 integrated circuit from ST microelectronics, IC2, that incorporates features to enhance the ability of the circuit to conduct with very low input voltages.

L3 and D7 are the boost inductor and diode respectively, feeding power to C1 a high voltage capacitor. The voltage at C1 is regulated by the action of R8, R10, R11, R17-19 and the feedback circuitry contained within IC2.

Output Control

As the output current is proportional to the aiming voltage across L1, it necessarily follows that variation of the DC link voltage at C1 will result in a variation of the output current from TX1 as the variation in voltage with respect to current (dynamic resistance) of the LED's and therefore the change in TX1 voltage is small.

Q4 is turned on and off by a gate voltage derived from the rectified input voltage waveform by R20-R22 and R33. The values are chosen so that Q4 turns on with very low voltages at the input and the gate is protected from over-voltage by ZD2, a 10V zener diode. The drain of Q4 switches a potential derived from a reference voltage by R32 and R23 and therefore represents the duty cycle of the input conduction very closely. The action of Q4 causes a reference to be largely independent of the peak value of the source AC voltage, matching the characteristics of some dimmers.

This drain voltage is presented to IC1*b* an unbalanced inverting amplifier with a low-pass characteristic. The output of the amplifier is scaled to provide a voltage reference that varies with the input conduction angle as a linear approximation to the power (that would be) available from the input, assuming the AC load to be a perfect resistor. As the output voltage is essentially constant, this power reference translates into being a current reference. The average voltage, representing transformer primary current, seen at R25 is compared against this reference by IC1*a* and the difference voltage, modified by suitable feedback and filtering components is used to control the gate of Q5. By transformer action, the current in the primary of TX1 is a fraction of the current in the output windings and therefore the average voltage at R25 represents the output current. Therefore the control action at the gate of Q5 is to control output current.

Another possible method of generating a reference voltage would be to average the input voltage irrespective of the phase angle of conduction. A different choice of circuit constants would permit a suitable current reference to be created. This would result in the circuit being sensitive to the peak value of the input AC waveform but would be a better match to some dimmers.

Q5 is placed in the feedback path of IC2 and its action is to progressively short R8.

When Q5 is not conducting at all, the voltage at C1 is a minimum and when Q5 is fully conducting, the voltage at C1 is a maximum. Therefore the voltage at C1 is constrained between two limits. This causes the LED current when not used with a dimmer to be the same as that when used with the design-nominal dimmers set to full power. Q5 is selected to be a "logic level" small signal enhancement-mode MOSFET. The voltage required at its gate for full conduction is very low and when it is zero, the unit is operating at its lowest output current. This results in good response to movements of the dimming control and minimises the magnitude and duration of transient uncommanded brightness levels.

Auxiliary Supply

The integrated circuits IC1 and IC2 are provided with power from TX1 by windings separate from the output section, but of the same configuration using D13 and D14 as rectifiers. Because the current supply is not pulsed, the storage capacitor C15 used for filtering of the auxiliary supply can be small.

As the LED voltage effectively clamps the output of the transformer to a fixed voltage, the auxiliary supply also is well defined in voltage. The number of turns is chosen so that the PFC circuit will start before the LED's begin to conduct, but will not rise near to the maximum allowable voltage of IC2 when the LED's are in full conduction. No additional regulation is required, leading to efficiency savings. IC1 has a greater permissible range of supply voltage than IC2 so does not affect choices of the supply voltage range. The reference voltage for the control circuit is a zener diode operated at the point that gives best stability of the voltage against supply and temperature variations.

Output Protection

In one implementation of the circuit, it is possible to disconnect the power supply from its LED load. In principle, this would cause the output voltage to rise to twice the nominal output voltage, but in practice the diodes D15 and D16 would fail as short circuits. In order to prevent this, a Silicon Controlled Rectifier is placed across the output and is triggered into conduction when the output rises above the nominal operating point causing a short circuit across the output of the output capacitor.

As the capacitor discharges, clamping the voltage of TX1, the auxiliary supply within the circuit falls close to zero and IC2 ceases operation. The voltage of C1 falls to the peak value seen at the input, less diode drops. By suitable choice of circuit constants, this causes the output current into a short circuit to be close to the nominal full-load current. Thus the circuit is proof against open circuits and short circuits without any feedback.

Sequence at Turn-on

Voltage is applied to the input.

C1 charges via the rectifier bridge of D1-D4, L3 and D7 to the peak value of the input voltage.

Immediately, Q1, Q2 begin to oscillate.

Current is supplied into the output capacitor.

The output voltage begins to rise and therefore the supply voltage to IC1 and IC2 rises.

IC1 immediately begins to monitor the transformer current.

At approximately 12V output, IC2 begins to operate and causes the voltage at C1 to rise.

The output current from TX1 begins to rise.

At the LED cut-in voltage, the load begins to conduct, preventing further rise of the output voltage.

The supply to IC1 and IC2 stabilises.

The voltage at C1 is controlled to the level demanded by the control circuit as a result of the dimmer setting.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A power distribution system for distributing high frequency AC power from a current limited power source, the system comprising:
   a twisted pair of elongate conductors configured to be connected to the power source, the ends of the conductors furthest from the power source being connected to one another, wherein the conductors between adjacent turns of the twisted pair are moveable apart from one another to define an aperture there between,
   a power tapping element which is configured to be inserted at least partly through the aperture so that high frequency electrical power can be coupled inductively from the conductors to the power tapping element,
   a further conductor wound at least partly around the power tapping element so that the high frequency electrical power can be coupled inductively from the power tapping element to the further conductor,
   a synchronous rectification circuit connected to the further conductor to convert high frequency AC power in the further conductor to a DC power to power a load, and
   a rectifier in the synchronous rectification circuit to controllably short circuit the further conductor to stop or vary power being transmitted to the load by controlling a switch using a signal other than the high frequency electrical power coupled inductively from the power tapping element to the further conductor.

2. The power distribution system according to claim 1, wherein the power tapping element is a splittable ferrite member.

3. The power distribution system according to claim 1, wherein the power tapping element comprises two spaced apart ferrite members.

4. The power distribution system according to claim 3, wherein one ferrite member is configured to be inserted at least partly through the aperture in the twisted pair and the other ferrite member is configured to be inserted at least partly through a second aperture in the twisted pair.

5. The power distribution system according to claim 1, wherein the load is an LED.

6. The power distribution system according to claim 1, wherein switching of the rectifier to controllably short circuit the rectification circuit is powered by power from the twisted pair.

7. The power distribution system according to claim 1, wherein the system incorporates a pulse density modulation arrangement to modulate power output from the system.

8. The power distribution system according to claim 1, wherein the system incorporates a plurality of power tapping elements which are each configured to attach to the twisted pair to tap power from the twisted pair.

9. The power distribution system according to claim 1, wherein the system further comprises a current limited high frequency AC power source which is connected to the twisted pair.

10. The power distribution system according to claim 9, wherein the power source is configured to convert mains power to high frequency AC power.

* * * * *